US00RE36437E

United States Patent [19]

Hanson et al.

[11] E Patent Number: Re. 36,437

[45] Reissued Date of Patent: Dec. 14, 1999

[54] SYSTEM AND METHOD OF MONITORING A VEHICLE AND/OR FOR CONTROLLING THE TEMPERATURE OF AN INTERIOR PORTION OF THE VEHICLE

[75] Inventors: Jay L. Hanson, Bloomington, Minn.; Loran W. Sutton, East Peoria, Ill.; Donald G. Knauff, Lakeville, Minn.

[73] Assignee: Harvey A. Slepian, Peoria, Ill.

[21] Appl. No.: 08/967,283

[22] Filed: Nov. 7, 1997

Related U.S. Patent Documents

Reissue of:

[64] Patent No.: 5,317,998
Issued: Jun. 7, 1994
Appl. No.: 08/114,401
Filed: Sep. 1, 1993

U.S. Applications:

[63] Continuation of application No. 08/405,749, Mar. 20, 1995, abandoned.

[51] Int. Cl.[6] ..... F02N 11/08

[52] U.S. Cl. ..... 123/179.4; 307/10.6; 307/10.7; 62/158; 62/244; 237/12.3 A

[58] Field of Search ..... 123/179.4, 179.3; 307/10.6, 10.7; 237/12.3 A, 12.3 B, 12.3 C; 62/243, 244, 157, 158

[56] References Cited

U.S. PATENT DOCUMENTS

| | | | |
|---|---|---|---|
| 3,569,724 | 3/1971 | Kuehn, III | 290/37 R |
| 4,006,723 | 2/1977 | Schmidli | 123/179.2 |
| 4,286,683 | 9/1981 | Zeigner et al. | 180/54.1 |
| 4,419,866 | 12/1983 | Howland | 62/228.4 |
| 4,421,075 | 12/1983 | Mandel | 123/142.5 |
| 4,482,812 | 11/1984 | Hori et al. | 290/38 R |
| 4,534,326 | 8/1985 | Bowcott | 123/179.3 |
| 4,878,465 | 11/1989 | Hanson et al. | 123/179.6 |
| 5,072,703 | 12/1991 | Sutton | 123/179.4 |
| 5,140,826 | 8/1992 | Hanson et al. | 62/115 |
| 5,186,015 | 2/1993 | Roehrich et al. | 62/133 |
| 5,222,469 | 6/1993 | Sutton | 123/198 DC |
| 5,275,011 | 1/1994 | Hanson et al. | 62/157 |

*Primary Examiner*—Andrew M. Dollnar
*Attorney, Agent, or Firm*—Matthews, Joseph, Shaddox & Mason, P.L.L.C.

[57] ABSTRACT

A *system and* method [of] *for* automatically starting and stopping an engine of a [truck] *vehicle* to conserve fuel while maintaining the engine in a ready-to-start condition, and while controlling the temperature of [a truck sleeper unit] *an interior portion of the vehicle*. The method includes the steps of selecting predetermined system parameters [via a password accessible interactive program, providing a first switch for selecting an automatic engine start-stop operating mode, providing a second switch for selecting an automatic temperature control mode for the truck sleeper unit, and providing safety apparatus which indicates when the truck engine may be safely operated in the automatic engine start-stop operating mode.] The method further includes the step of overriding the [ignition switch] *operator* control of the engine in response to a predetermined condition when [the] *a* first switch selects the automatic operating mode and the safety apparatus indicates the truck engine may be safely operated in the automatic operating mode. The engine is started and stopped automatically while the ignition switch control of the engine is being overridden by the overriding step, to maintain the engine in a ready-to-start condition, regardless of the selection of the second switch, and additionally controlling the temperature of the [sleeper unit,] *vehicle interior* when [the] *a* second switching means selects automatic temperature control. The overriding step is terminated in response to a predetermined condition, restoring [ignition switch] *operator* control of the engine, and preventing automatic re-starting of the engine while the [ignition switch] *operator* is in control of the engine.

71 Claims, 15 Drawing Sheets

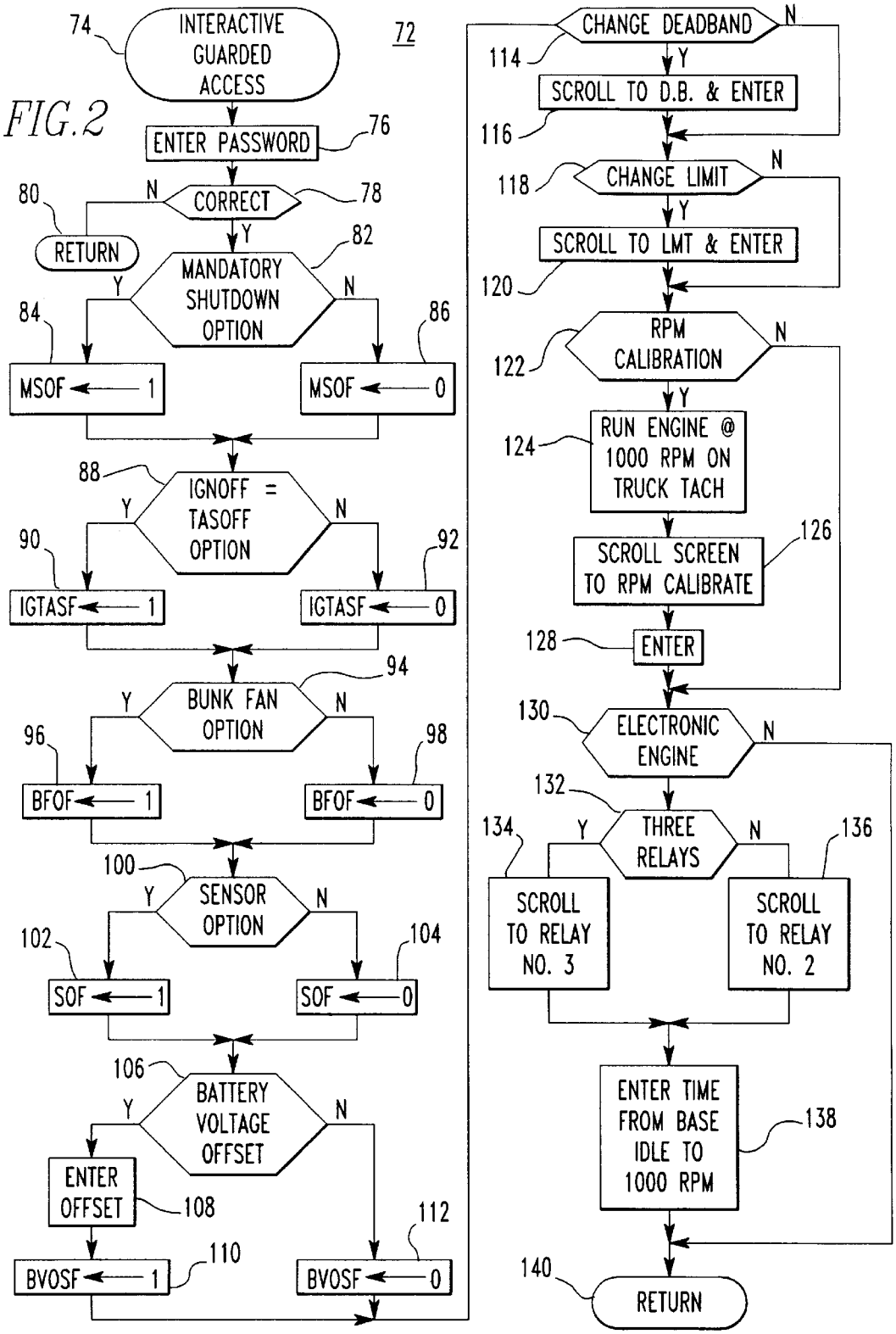
FIG.2
72
74
INTERACTIVE GUARDED ACCESS
ENTER PASSWORD
76
CORRECT
78
N
Y
80
RETURN
MANDATORY SHUTDOWN OPTION
82
84
86
MSOF ← 1
MSOF ← 0
IGNOFF = TASOFF OPTION
88
90
92
IGTASF ← 1
IGTASF ← 0
BUNK FAN OPTION
94
96
98
BFOF ← 1
BFOF ← 0
SENSOR OPTION
100
102
104
SOF ← 1
SOF ← 0
BATTERY VOLTAGE OFFSET
106
ENTER OFFSET
108
110
112
BVOSF ← 1
BVOSF ← 0
CHANGE DEADBAND
114
SCROLL TO D.B. & ENTER
116
CHANGE LIMIT
118
SCROLL TO LMT & ENTER
120
RPM CALIBRATION
122
RUN ENGINE @ 1000 RPM ON TRUCK TACH
124
SCROLL SCREEN TO RPM CALIBRATE
126
ENTER
128
ELECTRONIC ENGINE
130
THREE RELAYS
132
134
136
SCROLL TO RELAY NO. 3
SCROLL TO RELAY NO. 2
ENTER TIME FROM BASE IDLE TO 1000 RPM
138
140
RETURN

FROM FIG.3A 72
192
TASIF = 1
Y
N
MODE ← RUN
TASIF ← 1
TRB ← 0
CLEAR TIMERS
194
196
OP > PMIN
202
RPM > 450
204
ETSF = 1
ATSF = 1
206
DISPLAY LAMP
208
210
OTSF = 1
TAS ← 1
212
UPDATE OVRT
214
OVRT ≥ DT2
216
TAS ← 0
198
200
RETURN
218
OVD ← 1
220
TAS SWITCH ON
222
TAS ← 1
TAS ← 0
223
224
TAS = 1
226
MSOF = 1
FETCH MODE
228
CALL REQUESTED MODE
230

FIG.4

141

| ROM MAP |
|---|
| ACCDT |
| AT1 |
| DT1 |
| DT2 |
| HLT |
| LLT |
| MART |
| MIRT |
| OT1 |
| PMIN |
| TMAX |
| TMAX1 |
| TMAX2 |
| T1 |
| T2 |
| T3 |
| T4 |
| T5 |
| WT1 |
| △T |

FIG.5

143

| RAM MAP | | |
|---|---|---|
| AA | HAM | RNCHK |
| ACC | HAMODE | RPM |
| ATSF | HASWITCH | RPMSF |
| BFOF | HLT | RSTF |
| BT | IGTASF | SOF |
| BV | KEY | SP |
| BVOSF | LAVF | SRY |
| CRPM | LBV | STBZ |
| DF | LCVF | STF |
| DT | LEOFF | STT |
| EOHTF | LLT | STTR |
| EROF | MASRLY | TAS |
| ERT | MODE | TASIF |
| ERUN | MSOF | TASSWITCH |
| EST | OP | TFLG |
| ETSF | OPSF | TRB |
| FANT | ORTF | WT |
| FCR | OR15 | 1HRTF |
| FIDL | OT | 1HT |
| FOF | OTSF | △T |
| FOPT | OVD | △TMF |
| FOT | OVRT | △TMT |
| FUEL | PUIF | |

STOP DETERMINATION
316
314

TAS = 1
318
MSOF = 1
320
ERT ≥ 15
322
ERT ≥ MIRT
328
OR15 = 1
330
ERT ≥ 15M
332
READ & STORE PARAMETERS
334
OTSF = 1
336
WT ≥ TMAX
338
OT ≥ TMAX1
340
OP < PMIN
342
BV > 14.5V.
344
DELAY
346
EXPIRE
348
MODE ← SHUTDOWN
326
SAFETY STRING O.K.
350
WT > TMAX2
352
DELAY
354
EXPIRE
356
HA START
358
ERT ≥ MART
360
ACC = 0
362
BV > 13.4 V.
364
MASRLY ← 1
FUEL ← 1
366
ENGINE RUN-ON REQUIRED
368
EROF ← 1
370
RETURN
324

SYSTEM AND METHOD OF MONITORING A VEHICLE AND/OR FOR CONTROLLING THE TEMPERATURE OF AN INTERIOR PORTION OF THE VEHICLE

Matter enclosed in heavy brackets [ ] appears in the original patent but forms no part of this reissue specification; matter printed in italics indicates the additions made by reissue.

*This application is a continuation of reissue application No. 08/405,749 filed Mar. 20, 1995, now abandoned.*

TECHNICAL FIELD

The invention relates in general to [truck] engine control, and more specifically to *systems and* methods for automatically starting and stopping a [truck] *vehicle* engine to conserve fuel while providing temperature control of [a truck sleeper unit,] *an operator occupied interior portion of the vehicle* and *or* maintaining the engine in a ready-to-start condition.

BACKGROUND ART

U.S. Pat. No. 5,072,703 teaches apparatus for automatically starting and stopping a truck engine to conserve fuel while providing temperature control of a truck sleeper unit, and maintaining the engine in a ready-to-start condition. The apparatus of this patent works well in carrying out the required functions, but requires the expense of tailoring each such apparatus for the specific truck it is to be used with, and for accommodating the different needs and desires of different truck owners. For example, some truck engines are electronically controlled fuel injected engines, and some are not; and different truck engines have different numbers of teeth in the ring gear used for engine speed (RPM) detection, requiring each apparatus to be calibrated for the number of teeth in the ring gear of the truck it is to be used with. Some truck owners have different desires related to how an automatic engine control should operate relative to the position of the ignition switch, requiring the apparatus to be built in different models for different owners to accommodate the different options which are available. Some drivers do not like the engine starting and stopping during the sleeper unit temperature control mode, and will try to "fool" an engine start-stop system into operating all of the time, which thus defeats the fuel saving purpose of the apparatus. Further, the apparatus cannot detect and interpret different operating conditions and adapt to certain changing conditions in a way to more effectively carry out the purposes and functions of the apparatus.

Thus, it is an object of the present invention to provide new and improved methods for operating [a truck] *an* engine in an automatic start-stop mode, when it is safe to do so, to conserve fuel while maintaining the [truck] engine in a ready-to-start condition, [and] *and/or* while controlling the temperature of [a truck sleeper unit] *an interior portion of the vehicle* when such temperature control is desired. The new *systems and* methods should improve the flexibility of apparatus constructed according to the methods, accommodating different truck engine designs as well as different control options which may be desired by [truck] *engine* owners. The new methods should further sense when the system is being "fooled" into continuous operation, and should take appropriate action to maintain the desired start-stop fuel saving operation. Finally, the new methods and apparatus should sense when different operating conditions make the parameters being used inefficient, and should further be able to change or modify the parameters, at least until the operating conditions change back to where the parameters being used are effective.

SUMMARY OF THE INVENTION

Briefly, the present invention relates to *systems and* methods for automatically starting and stopping an engine of a [truck] *vehicle* having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition. The methods include steps for: selecting predetermined system parameters [via a password accessible interactive program, providing first switch means for selecting an automatic engine start-stop operating mode, providing second switch means for selecting an automatic temperature control mode for the truck sleeper unit, providing safety means which indicates when the truck engine may be safely operated in the automatic engine start-stop operating mode,] overriding the ignition switch control of the engine in response to a predetermined condition when [the] *a* first switch means selects [the] *an* automatic operating mode and [the] *a* safety means indicates the [truck] engine may be safely operated in the automatic operating mode, starting and stopping the engine automatically while the [ignition switch] *operator* control of the engine is being overridden by the overriding step, to maintain the engine in a ready-to-start condition, [regardless of the selection of the second switch means,] starting and stopping the engine automatically while the [ignition switch] *operator* control of the engine is being overridden by the overriding step, to maintain the engine in a ready-to-start condition, [and] *and/or* to control the temperature of the [sleeper unit] *vehicle interior*, when [the] *a* second switching means selects automatic temperature control, terminating the overriding step in response to a predetermined condition, restoring [ignition switch] *operator* control of the engine, and preventing automatic restarting of the engine while the [ignition switch] *operator* is in control of the engine.

Desirable embodiments of the invention relate to methods for accommodating electronically controlled fuel injected engines, as well as [non fuel] *non-fuel* injected engines; calibration methods related to engine speed detection; methods for changing all battery voltage references by a single battery voltage offset selection; selection of a predetermined one of several dead band ranges about the set point temperature of the [sleeper unit] *vehicle interior*; [automatic] *automatically* changing a selected dead band range to improve system operating conditions; methods and apparatus for detecting when the system is being fooled into operating continuously, with steps for retaining automatic start-stop operation; methods for option selection which enable different truck owners to operate the same start-stop apparatus in different operating modes; and methods and apparatus for automatically changing the operation of the apparatus to insure that *the* engine is in a ready-to-start condition before the engine is stopped.

*Throughout this application, reference to "predetermined" paramters, conditions, etc. includes any manner of determination, including adaptive determination.*

BRIEF DESCRIPTION OF THE DRAWINGS

The invention will become more apparent by reading the following detailed description in conjunction with the drawings, which are shown by way of example only, wherein:

FIG. 2 is a flow diagram of an [interactive guarded] access program which enables authorized personnel to initialize the system according to the engine the apparatus is to be used with, and to select or reject different options which are available in the operation of the apparatus;

FIG. 4 is a ROM (read-only-memory) map of different program constants and default values used by the programs of FIGS. 3A, 3B, and the other programs of the system;

FIG. 5 is a RAM (random-access-memory) map which illustrates different timers, flags, counters, and variables which are generated and stored by the programs of FIGS. 3A, 3B, and the other programs of the system;

DESCRIPTION OF PREFERRED EMBODIMENTS

Figure 1:
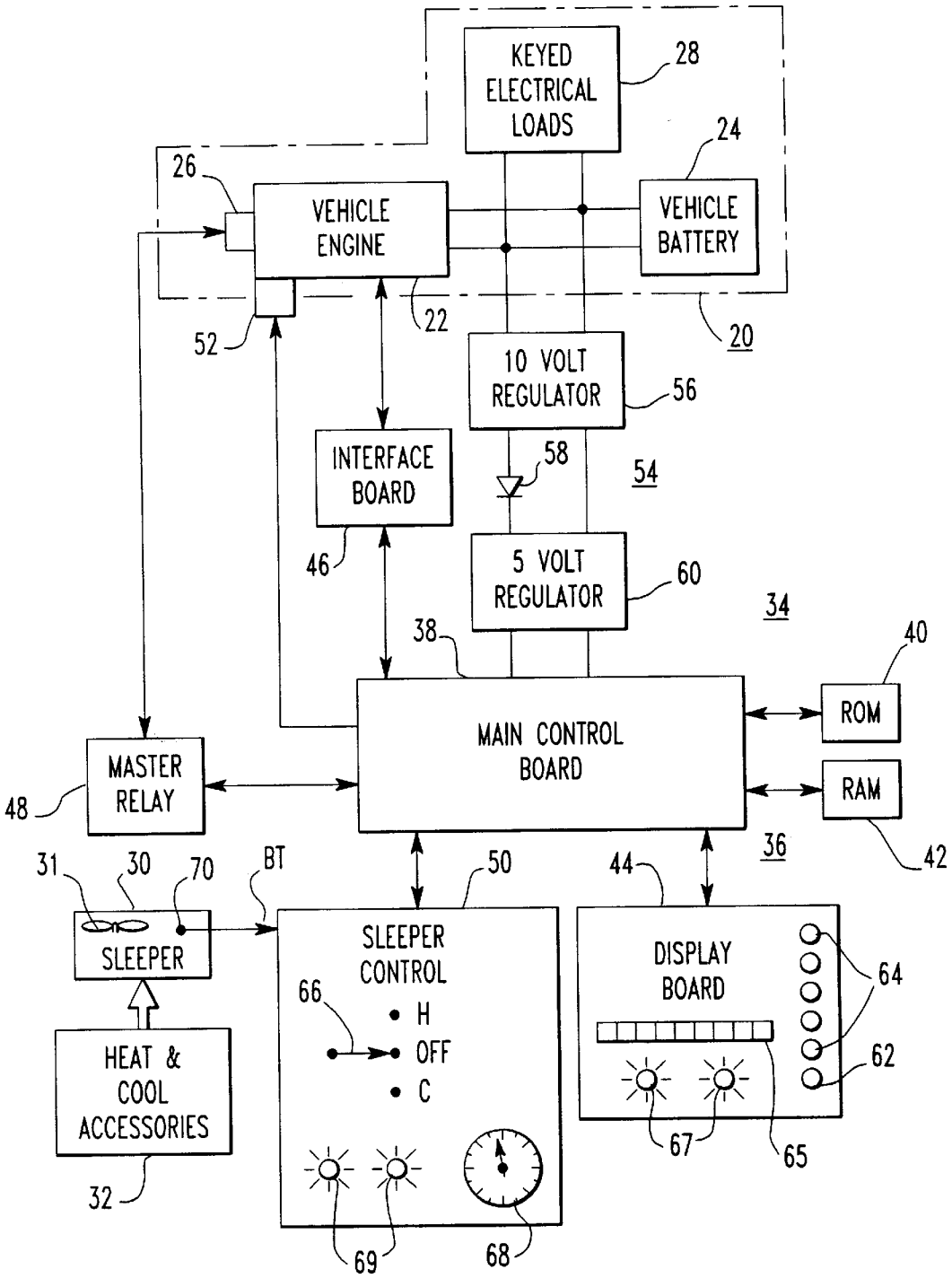
FIG. 1 is *a* partially schematic and partially block diagram of engine control apparatus which may be constructed and operated according to the teachings of the invention.

Referring now to the drawings, and to FIG. 1 in particular, there is shown a truck 20 having an engine 22, a battery 24, an ignition switch 26 which controls the connection of a plurality of electrical loads 28 to battery 24, and a bunk or sleeper unit 30 having a fan 31. Sleeper unit 30 includes heating and cooling accessories 32, which are part of the "keyed" electrical loads shown generally at 28.

Engine monitoring and control apparatus 34 constructed according to the teachings of the invention includes a controller 36 having a main control board 38, a read-only memory (ROM) 40, and a random-access memory (RAM) 42. Monitoring and control apparatus 34 further includes a display board 44, an interface board 46, a master relay 48, a sleeper control unit 50 disposed in sleeper unit 30, engine control 52 which includes a fast idle control servo, and a power supply 54. Power supply 54 includes the truck battery 24, a 10 volt regulator 56, a diode 58, and a 5 volt regulator 60. Regulator 60 includes a capacitor to sustain the input voltage during engine cranking.

Outputs from controller board 38 to interface board 46 include an output SRY to a start relay, an output FUEL to a fuel relay, and an output STBZ to a buzzer in the engine compartment which warns when an automatic engine start is going to be made to maintain engine 22 in a ready-to-start condition.

Inputs to controller board 38 via interface board include oil pressure OP, water (engine coolant) temperature WT, oil temperature OT, ambient temperature AA, engine speed RPM, and inputs from a string of safety related switches, such as a tilt switch which indicates when the engine hood is closed, a parking brake switch, which indicates when the parking brake is engaged, and a neutral switch, which indicates when the truck transmission is in neutral or park.

Display board 44 includes a switch or push button 62, hereinafter called TAS switch 62, which selectively turns the automatic control system 34 on and off, and a plurality of additional switches or push buttons 64 associated with functions such as scrolling the display to select items on a menu, incrementing and decrementing control parameters, an "enter" button for storing control parameters, a display "freeze" button, and the like. A display 65, such as a 16 character dot matrix LCD display, and indicating lamps 67 are also provided.

Sleeper control 50 includes a switch 66, hereinafter called HA switch 66, which has positions to turn sleeper temperature control off, and to turn sleeper temperature control on, to either a heating mode or a cooling mode. Sleeper control 50 further includes a set point temperature selector 68 and indicating lamps 69.

Sleeper unit 30 includes a temperature sensor 70 which provides a signal BT to sleeper control 50.

Master relay 48, when energized, disables normal control of engine 22 by ignition switch 26, overriding ignition switch 26 and controlling the operation of engine 22 according to the operating programs of control 34. Inputs to master relay 48 include a 12 volt ignition input, an accessory input, and a current source for ignition key sense.

FIG. 2 is a flow diagram of an interactive guarded access program 72 which enables authorized personnel to select program options, and to initialize the engine monitoring and control apparatus 34 to the specific truck it is to be used with. Program 72 is entered at 74 and step 76 prompts the user to enter a password. Step 78 determines if the password entered is correct, and if it is not, the program exits at 80. If the entered password is correct, program 72 then proceeds through a menu of program options and initialization procedures which enable the user to tailor the engine monitoring and control apparatus 34 to the specific truck and specific requirements of the user.

For example, step 82 asks if the user desires to activate a mandatory shutdown option. When the ignition switch 26 is "on" and TAS switch 62 is switched from the "on" to the "off" position, control of engine 22 will normally be returned immediately to ignition switch 26. When the mandatory shutdown option is selected, indicating by setting a flag MSOF in step 84, override control will be continued for a predetermined period of time. For example, when the items in the safety chain of switches indicate that the transmission is in neutral, the parking brake is set, and the engine hood is down, engine 22 will be stopped after a predetermined period of time, such as 15 minutes. When the mandatory shutdown option is not selected, indicated by resetting flag MSOF in step 86, engine monitoring and control apparatus 34 does nothing to keep engine 22 running.

Step 88 asks if the user desires to activate an IGNOFF=TASOFF option, which option is concerned with the position of ignition switch 26 and its effect on operation of control apparatus 34. When this option is selected, indicated by setting a flag IGTASF in step 90, when ignition switch 26 is off, control apparatus 34 is also off, regardless of the position of TAS switch 62.

When option IGNOFF=TASOFF is not selected, indicated by resetting flag IGTASF in step 92, when ignition switch 26 is off, TAS switch 64 is enabled and HA switch 66 is disabled. Thus, control apparatus 34 will operate in the engine readiness mode only, maintaining engine 22 in a ready-to-start condition, as controlled by TAS switch 62. Environmental control of sleeper unit 30, controlled by HA switch 66, will not be operational.

When option IGNOFF=TASOFF is not selected and ignition switch 26 is on, then both the TAS switch 62 and the HA switch 66 are enabled, activating the engine readiness mode when TAS switch 62 is switched on, and adding sleeper unit temperature control when HA switch 66 is switched on. TAS switch 62 must be on in order for HA switch 66 to be effective. In other words, TAS switch 62 is the master switch for control apparatus 34, and it must be on in order for any automatic overriding control functions to occur.

Step 94 asks if a bunk or sleeper fan option is selected. When selected, indicated by setting a flag BFOF in step 96, when sleeper environmental control is active, the sleeper fan 31 will be operated during both engine on and engine off cycles. A program shown in FIG. 15 monitors battery voltage and the drain on battery 24 by sleeper fan 31 during engine off cycles, taking appropriate action to maintain engine 22 in a ready-to-start condition. When the sleeper fan option is not selected, indicated by resetting flag BFOF in step 98, sleeper unit fan 31 is operated only during engine on cycles.

Figure 16:
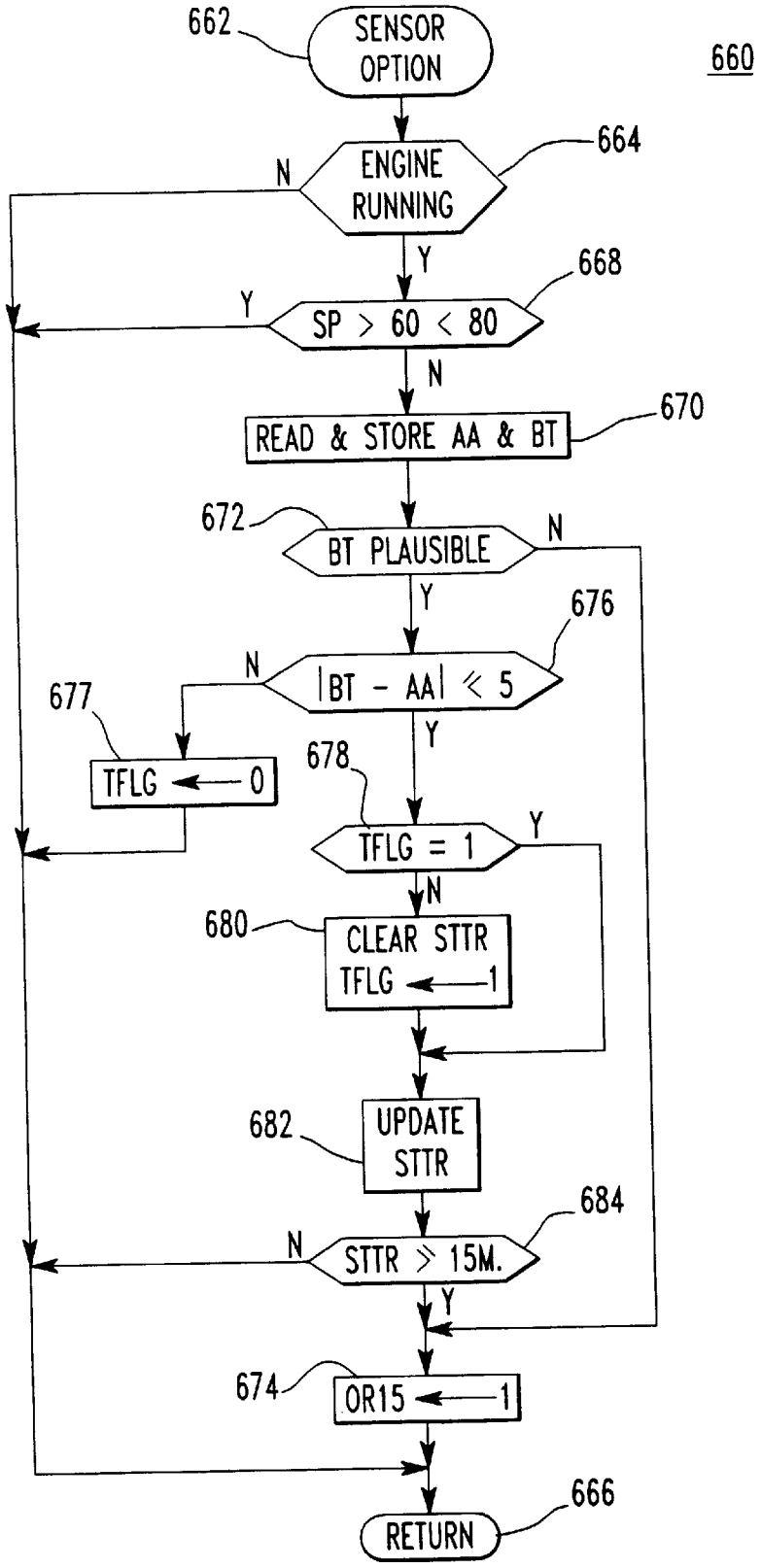
FIG. 16 is a flow diagram of a program which illustrates an option relative to the temperature sensor used to measure the temperature of the sleeper unit, which is useful when the temperature sensor may be placed outside the [sleeper] *vehicle* in ambient air, to "fool" the system into operating the [truck] engine continuously.

Step 100 asks if a sensor option, related to sleeper unit temperature sensor 70, is to be activated. When activated, indicated by setting a flag SOF in step 102, a program shown in FIG. 16 is run periodically during sleeper unit temperature control to determine if sensor 70 has been placed in the ambient air in an effort to keep engine 22 running continuously, defeating the fuel saving purpose of control apparatus 34. When this unauthorized operation is detected, appropriate action is taken to retain the fuel saving start-stop operation of engine 22. When this sensor option is not selected, indicated by resetting flag SOF in step 104, the program shown in FIG. 16 is not run.

Step 106 asks if the user desires to enter a battery voltage offset. The programs to be hereinafter described include comparisons of battery voltage with several different battery voltage references. This option, in effect, enables all such battery voltage references to be changed by adding or subtracting a voltage offset to the measured battery voltage. When this option is selected, the algebraic sign and magnitude of the battery voltage offset is entered at set 108, using predetermined switches 64 on display 44. A flag BVOSF is set in step 110 to indicate that the option is active. When this option is not selected, indicated by resetting flag BVOSF in step 112, the measured battery voltage will be used in the comparisons, without modification.

When sleeper temperature control is active, engine 22 is turned off when the bunk temperature is within a predetermined temperature range above and below the set point temperature selected on set point temperature selector 68, with this temperature range being hereinafter called a "dead band". The dead band has a default value of 10° F., 5° above and 5° below the set point temperature, ie., ±5. Step 114 asks the user if the dead band should be changed to some other value, such as ±4, ±6, ±7, or ±10, for example. If the user desires to change the default value, as indicated in step 116, the user scrolls to "dead band" on the menu, using a scroll switch among switches 64. The displayed value is incremented or decremented to the desired dead band, using an appropriate switch, and then an "enter" key or switch is depressed, to store the new value in RAM 42.

The "no" branch of step 114, and step 116, both advance to step 118 which asks if upper and lower ambient temperature limits should be changed. The upper and lower ambient temperature limits are used to initiate continuous engine operation when engine 22 is under automatic control of control apparatus 34. Upper and lower limit default values, for example, may be 90° F. and 0° F., respectively. The upper and lower temperature limits are programmable by the user to other values. As indicated by steps 118 and 120, when the user indicates that the limits are to be changed, step 120 directs the user to scroll to "upper limit", or "lower limit" on display 65, and then enter the desired limit value, such as upper limits of 100° F., 95° F., 85° F. or 80° F., and such as lower limits of 10° F., 5° F., −5° F., or −10°F.

Engine control apparatus 34 is for use on different trucks made by different manufacturers. Steps 122, 124, 126 and 128 permit the user to calibrate the engine speed measurements (RPM) to the specific truck. Step 122 asks if the user desires to calibrate engine RPM measurements, and if so, step 124 directs the user to operate the truck engine at 1000 RPM as indicated on the truck's tachometer. Step 126 directs the user to scroll the display 65 to "RpM Calibrate", and when the truck engine is running at 1000 RPM, the "enter" button is depressed, as indicated in step 128. With this bench mark, all engine speed measurements will thereafter be accurately interpreted by engine control 34.

Engine control apparatus 34 may be used with electronic fuel injected engines, and with non-electronic engines. Electronic engines normally have either two control relays or three control relays, depending upon the manufacturer. Step 130 asks if engine 22 is an electronic engine. If it is, step 132 asks if the electronic engine has three control relays. If the electronic control has three relays, step 134 asks the user to scroll display 65 to Relay 3, and if the electronic control has two relays, step 136 asks the user to scroll to Relay 2. Step 138 then asks the user to enter the time in seconds from base idle RPM to 1000 RPM, as stated in the engine specifications. Fast idle control is initiated immediately after fuel is turned on for non-electronic engines, and a time delay is utilized for electronic engines. Steps 130 through 138 enable engine control 34 to coordinate correctly with the specific electronic engine utilized. Fast idle control is terminated a predetermined period of time before shutdown for all types of engines, such as 30 seconds. Program 72 then exits at 140, and the options selected and values entered cannot thereafter be changed, except by authorized personnel in possession of the correct password. Certain of the values, however, may be automatically changed by certain of the operating programs to be hereinafter described, to improve operation of engine control 34.

Figure 3A:
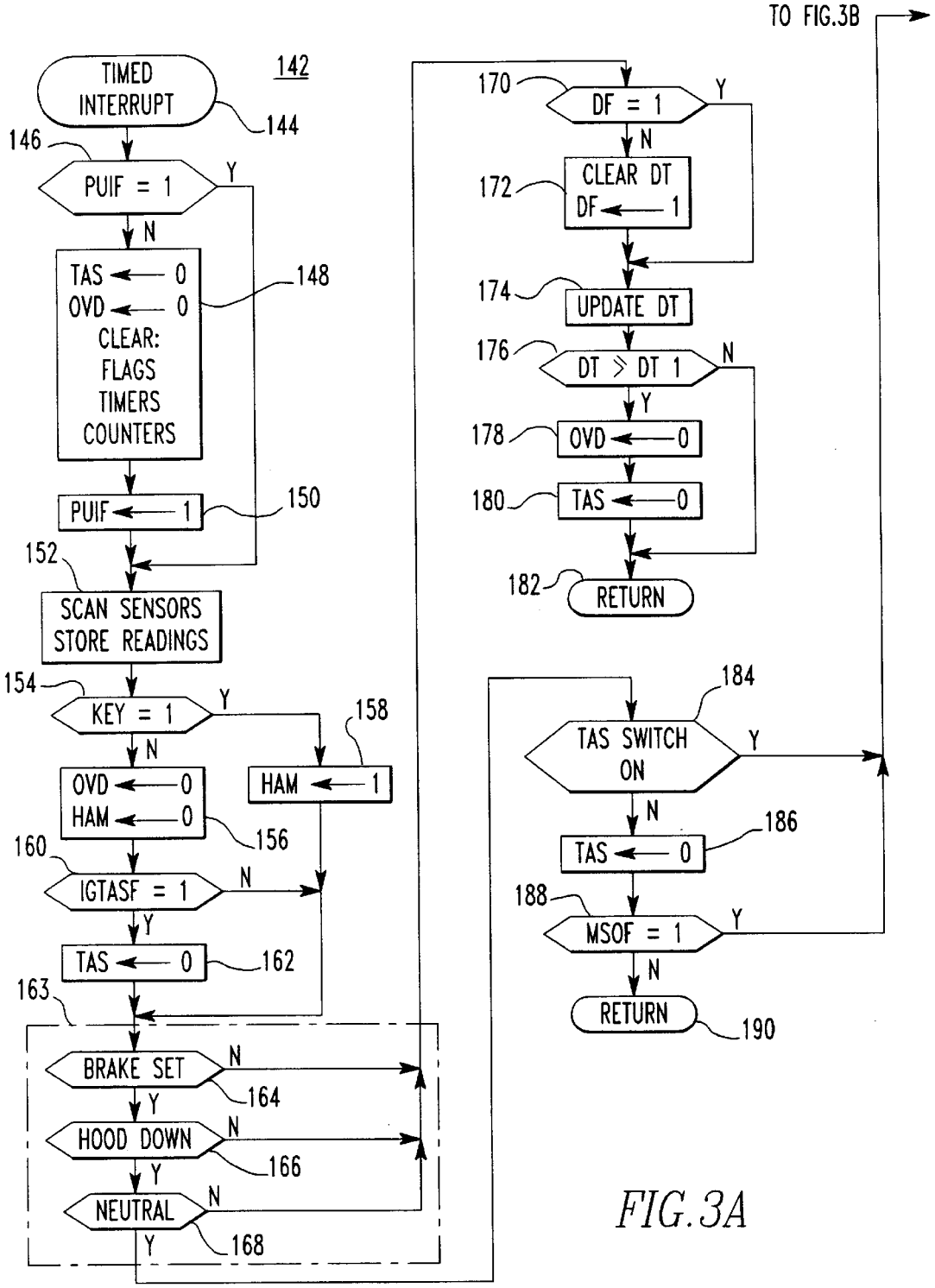
FIGS. 3A and 3B may be combined to provide a flow diagram of a main operating program which is run periodically to enable and disable automatic engine operation, to enable and disable automatic temperature control of a [truck sleeper unit] *vehicle interior*, and to execute different operating programs which are required to operate at any given time.
Figure 3B:
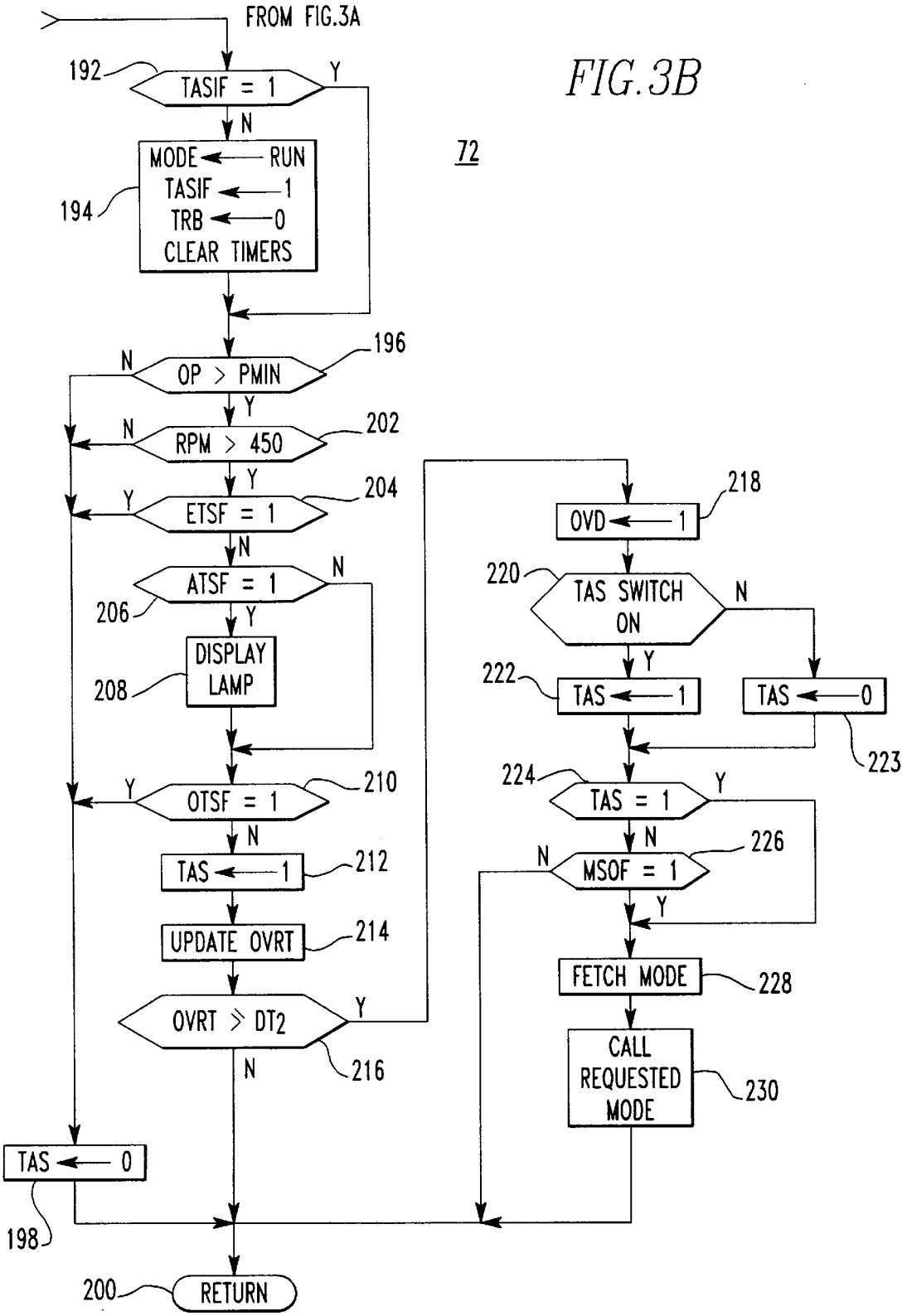

FIGS. 3A and 3B may be combined to provide a flow diagram of a main program 142 which is run periodically, such as with time interrupts, and which may thus maintain all of the software timers of the various programs. The main purpose of program 142 is to determine when the engine control 34 should be active, when engine control by ignition switch 26 should be overridden, and when to run the different operating programs. For convenience, the various signals, timers, counters, flags, and the like, referred to in FIGS. 3A and 3B, as well as those used in the remaining operating programs, are listed in a ROM map 141 in FIG. 4, or in a RAM map 143 in FIG. 5, depending upon where the various signals, etc., are stored.

Program 142 is entered at 144, and step 146 checks a power-up initiation flag PUIF to determine if program 142 has been initialized. If flag PUIF is found to be reset, step 148 initializes control apparatus 34 to an inactive condition by resetting a flag TAS, ignition switch control of engine 22 is enabled by resetting an override flag OVD, and all flags, timers and counters are cleared. Step 150 then sets flag PUIF, so that when step 146 is encountered on the next running of program 142, step 148 will be skipped.

Step 152 scans the various analog and digital sensor inputs and stores the values for later use. Step 154 then checks a flag KEY, which is set, or a logic one, when ignition switch 26 is "on", and reset, or a logic zero, when ignition switch 26 is "off". When ignition switch 156 is off the override flag OVD is reset, an enable flag HAM for sleeper environmental control is reset, preventing any sleeper temperature control while ignition switch 26 is off. Once one of the safety string switches is no longer safe for automatic operation, engine control 34 terminates override of ignition switch 26, returning control of engine 22 to ignition switch 26.

Step 154 advances to step 160 which checks the condition of option flag IGTASF, which was either set in step 90 or reset in step 92 of FIG. 2. When step 160 finds flag IGTASF set, it indicates that when ignition switch 26 is off, no automatic control of engine 22 is permitted, and step 160 advances to step 162 which resets flag TAS, preventing operation of automatic engine control 34 regardless of the position of TAS switch 62.

When step 154 finds that ignition switch 26 is "on", step 158 sets a flag HAM, which enables temperature control of sleeper unit 30 when other conditions are met, such as flag TAS being subsequently set, and HA switch 66 being in an "on" position.

Steps 158, the "no" branch of step 160, and step all advance to a series 163 of steps which form a "safety string", checking various conditions to determine if it is safe to place engine 22 under the automatic start-stop control of engine control 34. For example, step 164 may check a signal which indicates whether the truck parking brakes are engaged or released, step 166 may check a signal which indicates whether a truck engine hood is open or closed, and step 168 may check a switch which indicates whether the truck transmission is safe, ie., in park or neutral, or unsafe,. ie., not in park or neutral.

If any item in the safety string 163 is not safe for automatic start-stop operation of truck engine 22, the safety string branches to step 170, which checks the condition of a delay flag DF. If delay flag DF is reset, it indicates that a time delay, initiated to provide a reasonable time for the safety string 163 to become "safe", has not been activated. Step 172 then clears a delay timer DT and sets delay flag DF. Step 174 updates delay timer DT, and step 176 compares the value of delay timer DT with a value DT1 stored in ROM 40. If the delay time has not reached DT1, step 176 exits program 142 at 182. The next time program 142 is run, step 170 proceeds directly to step 174, to update delay timer DT. If the safety string 163 finds safe operation before delay timer DT reaches DT1, the safety string 163 branches to step 184. If step 176 finds that delay timer DT has reached DT1, it indicates that safe operation has not been achieved during the delay time, and steps 178 and 180 reset the override flag OVD and the enable flag TAS, de-activating control apparatus 34.

When the safety string 163 finds safe operation, step 168 advances to step 184 which checks the position of TAS switch 62. If TAS switch 62 is off, step 186 resets enable flag TAS, and step 188 checks the condition of the mandatory shutdown option flag MSOF, which was either set or reset in steps 84 and 86, respectively. If the mandatory shutdown option is found to be reset, control 34 does nothing to keep engine 22 running, and step 188 exits program 142 at 190. If step 188 finds flag MSOF set, then override control is still active for a predetermined period of time, if engine 22 is running, even with TAS switch 62 "off".

When step 184 finds TAS switch 62 "on", and also when TAS switch 62 is "off" and flag MSOF is set, steps 184 and 188 both advance to step 192. Step 192 determines if automatic operation has been initialized by checking the condition of an initialization flag TASIF. If flag TASIF is found to be reset, step 194 initializes the system by setting a digital value MODE to RUN (e., 01), as engine 22 must be running before automatic control apparatus 34 will be initially activated. Step 194 also clears the various software timers, it resets a trouble flag TRB, and it sets initialization flag TASIF, so step 194 will be skipped on the next running of program 72.

Step 194 and the "yes" branch of step 192 both advance to step 196 which checks the engine oil pressure OP relative to a minimum value PMIN stored in ROM 40. If the engine oil pressure OP is not greater than the minimum value PMIN, engine 22 is off, or should not be operated automatically, and step 198 resets flag TAS, preventing automatic operation of engine 22, and program 72 exits at 200. If engine oil pressure is O.K., step 202 compares engine RPM with a predetermined minimum value, such as 450 RPM. If the engine speed does not exceed this minimum value, engine 22 should not be placed under automatic operation, and step 202 goes to step 198.

When steps 196 and 202 find engine 22 to be operating at a level which permits automatic operation, certain engine sensors are checked for failure. When a sensor is returning an implausible value, a flag associated with this sensor is set in a diagnostics program. Step 204 checks an engine temperature sensor failure flag ETSF. If this flag is found to be set, step 204 goes to step 198. When step 204 finds the engine temperature sensor to be operative, step 206 checks an ambient temperature sensor failure flag ATSF. When step 206 finds flag ATSF set, step 208 stores an alarm code in RAM 42 and it also illuminates an alarm lamp on display 44, but the setting of flag ATSF does not prevent automatic operation. The "no" branch of step 206 and step 208 both proceed to step 210 which checks the condition of an engine oil temperature sensor failure flag OTSF. When flag OTSF is found to be set, step 198 proceeds to step 198, to prevent automatic operation of engine 22.

When the "no" branch of step 210 is reached, it indicates that engine 22 is running, the safety string 163 indicates that it is safe to place engine 22 under automatic start-stop control, and critical engine sensors are operative. Step 212 sets flag TAS, enabling automatic start-stop operation of engine 22. Step 216 updates an override timer OVRT, which delays overriding of ignition switch 26 for a predetermined period of time after the setting of flag TAS, to give the driver time to start a run before apparatus 34 overrides normal ignition control of engine 22 and shuts off keyed electrical loads 28 and 32. Step 216 compares the value of override timer OVRT with a time value DT2 stored in ROM 40, and program 72 exits at 200 until step 216 finds that the override delay time DT2 has expired.

Step 216 branches to step 218 when the time delay DT2 expires before the driver "breaks" the safety string 163, with step 218 setting the override flag OVD, which allows control apparatus 34 to take over control of engine 22, shutting down all keyed electrical loads.

Step 220 checks the position of TAS switch 62, setting TAS flag in step 222 when TAS switch 62 is "on", and resetting TAS flag TAS in step 223 when TAS switch 62 is "off". Step 224 checks the condition of TAS flag 224. When step 224 finds flag TAS set, TAS switch 62 is requesting automatic start-stop operation of engine 22, and step 228 fetches MODE, to determine which operational program should be run, and step 230 runs the program. Digital value MODE, for example, when 01, may indicate the program RUN of FIG. 6, a value of 10 may indicate the program SHUTDOWN of FIG. 9, and a value of 11 may indicate the program START of FIG. 11. When step 224 finds flag TAS reset, ignition override is discontinued in a manner dictated by the condition of the mandatory shutdown flag MSOF. Step 226 checks flag MSOF and if flag MSOF is reset, this option is not action, and step 226 proceeds to exit 200. When step 226 finds flag MSOF set, step 226 goes to step 228.

Figure 6:
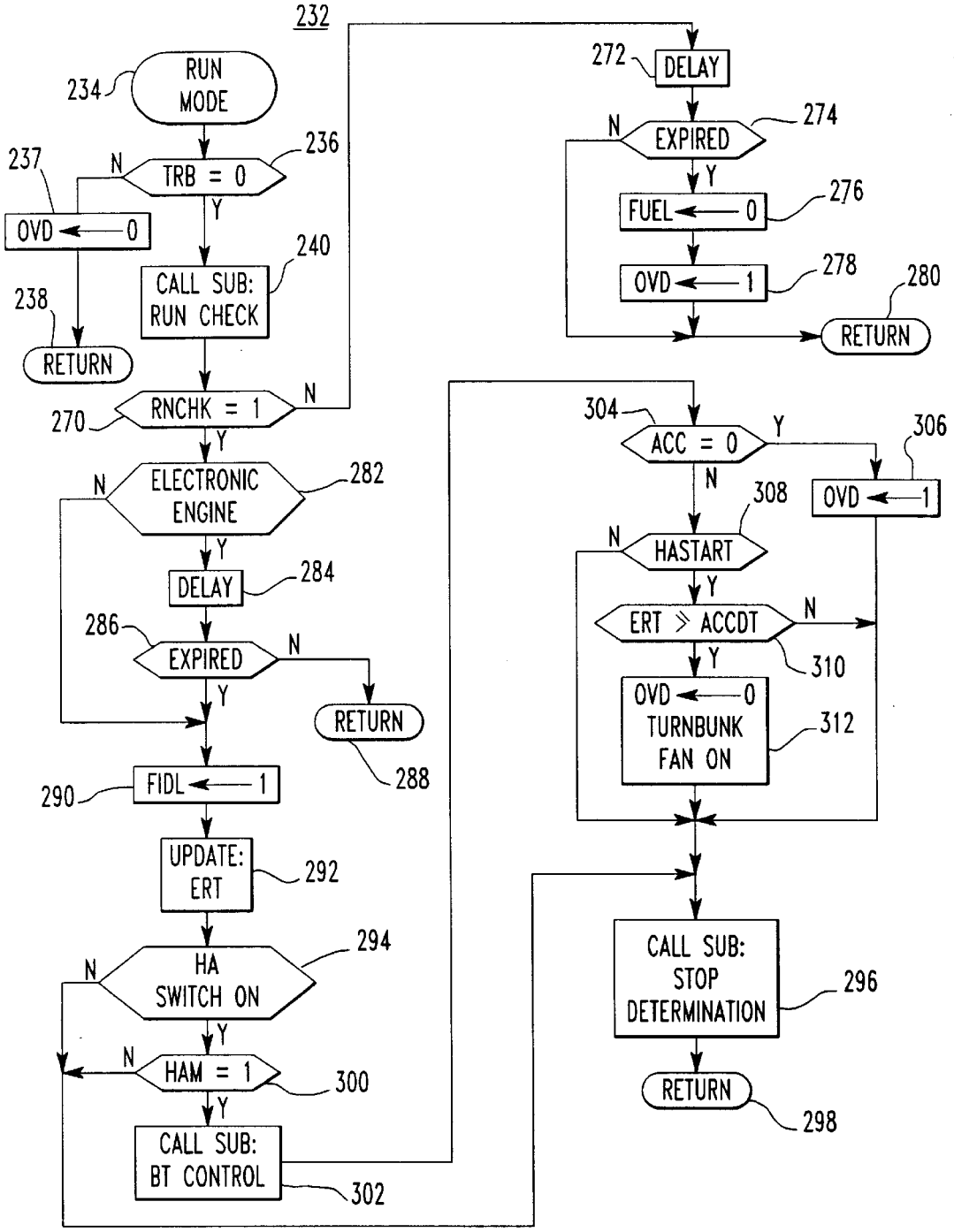
FIG. 6 is a flow diagram of a program RUN which implements the operation of the system while the [truck] *vehicle* engine is running.

The first program called by program 72 will be program RUN, the initialization mode selected by step 194. FIG. 6 is a flow diagram of a program 232 which implements program RUN. Program 232 is entered at 234 and step 236 checks the condition of a flag TRB, which is set in a program RUN CHECK shown in FIG. 7 when engine 22 is found to be shutdown. When flag TRB is found to be set, the program exits at 238, after resetting flag OVD in step 237, to return control of engine 22 to ignition switch 26.

Figure 7:
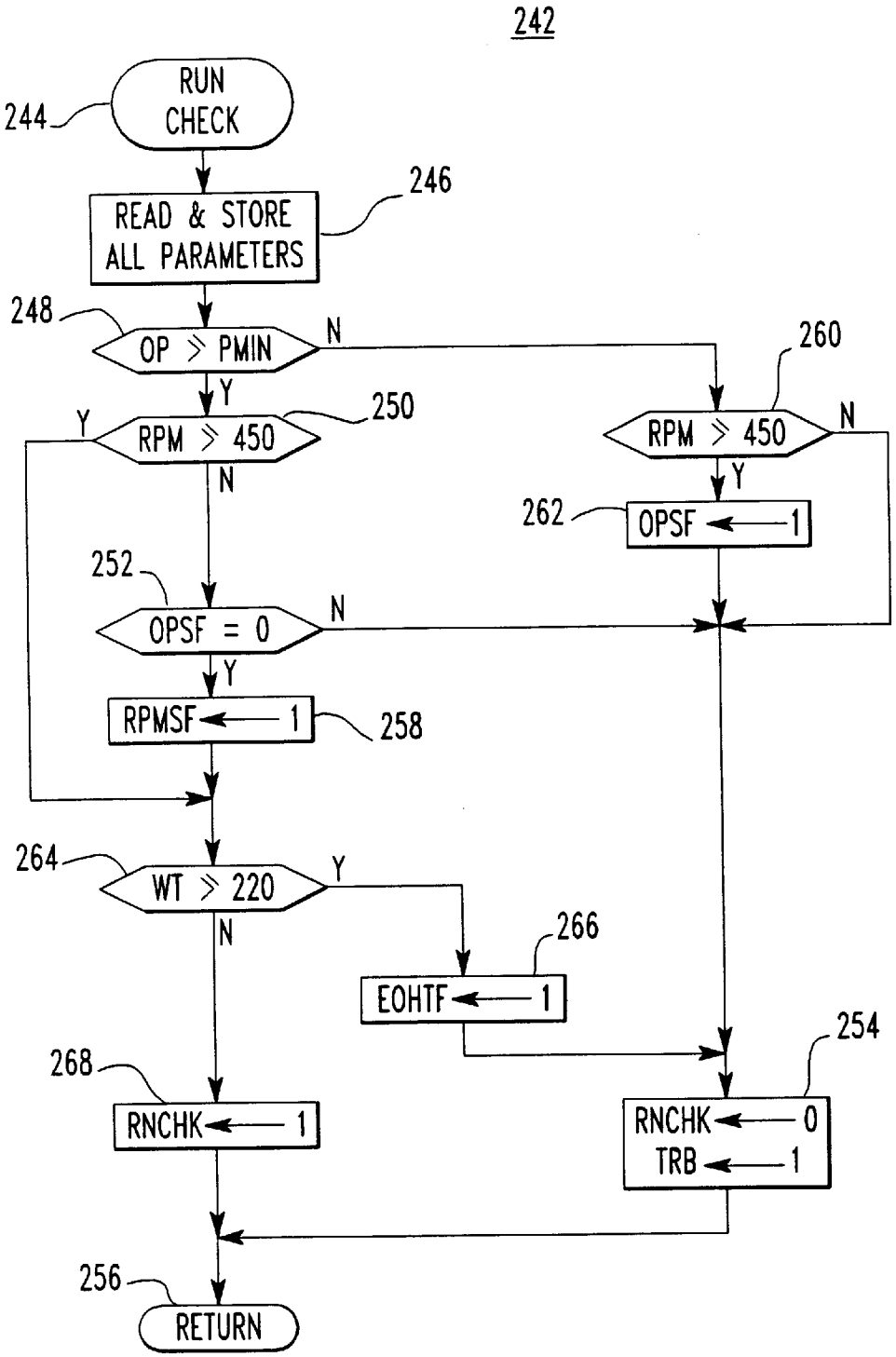
FIG. 7 is a flow diagram of a program RUN CHECK which is called by the program RUN shown in FIG. 6 to check on the running condition of the [truck] *vehicle* engine.

When flag TRB is found to be reset, step 240 calls the program RUN CHECK in FIG. 7 just referred to, to determine how engine 22 is running according to the engine sensors. FIG. 7 is a flow diagram of a program 242 for implementing RUN CHECK, which is entered at 244. Step 246 reads and stores all pertinent sensor readings required to check engine 22 for proper operation. Step 248 compares engine oil pressure OP with the predetermined minimum value PMIN stored in ROM 40. When the oil pressure OP is found to be above PMIN, step 250 checks the RPM sensor reading versus a predetermined minimum speed, such as 450 RPM. If engine RPM is found to be less than the predetermined minimum, step 250 goes to step 252 which checks an oil pressure sensor failure flag OPSF. If flag OPSF is found to be set, the oil pressure sensor has failed and step 252 goes to step 254 which resets a flag RNCHK, and it sets flag TRB, and program 242 returns to program 232 in FIG. 6.

When step 252 finds the oil pressure sensor is O.K., step 252 goes to step 258 which sets a flag RPMSF, to indicate that the RPM sensor has failed, as step 248 indicated the engine oil pressure exceeded PMIN and step 252 indicated the oil pressure sensor was O.K., while step 250 indicated an engine RPM inconsistent with the oil pressure reading.

If step 248 finds that engine oil pressure OP is low, step 260 compares engine RPM with a predetermined minimum value, such as 450 RPM. If engine RPM exceeds 450 RPM, step 262 sets oil pressure sensor failure flag OPSF, and step 262 proceeds to step 254. If step 260 finds low RPM, step 260 proceeds to step 254.

The "yes" branch of step 250, and step 258 both proceed to step 264 which compares the temperature WT of the engine coolant with a predetermined maximum value, such as 220° F. If the engine coolant is above this maximum value, step 264 proceeds to step 266 which sets an engine overheat flag EOHTF, and step 266 goes to step 254.

When step 264 finds that the engine coolant temperature is O.K., step 264 goes to step 268 which sets flag RNCHK, to indicate that engine 22 is running O.K. according to the engine sensors. Exit 256 returns program 242 of FIG. 7 to program 232 of FIG. 6 and step 270 of FIG. 6 checks the condition of the engine running flag RNCHK. If flag RNCHK is found to be reset, it indicates that engine 22 is not running, or is running poorly, and step 270 proceeds to steps 272 and 274 which provide a predetermined short delay time, such as 2 seconds. Step 276 shuts engine down by resetting the output signal FUEL to the fuel relay, and step 278 restores control of engine 22 to ignition switch 26 by resetting the override flag OVD. Program 232 then exits at 280.

When step 270 finds that engine running flag RNCHK is set, indicating engine 22 is running properly, step 282 determines if engine 22 is an electronically controlled fuel injected engine. If it is, steps 284 and 286 provide a predetermined time delay, exiting program 232 until the time delay has expired, at which time step 290 sets an output signal FIDL high, which signal goes to the fast idle servo 52. When step 282 finds that engine 22 is not an electronic engine, step 282 proceeds to step 290 Without delay.

Step 292 updates an engine running time timer ERT, the value of which will be compared with a minimum run time value MIRT, which provides time for a driver to start a run; a maximum run time value MART, which controls the maximum idle time during a start made to keep engine 22 in a ready-to-start condition; and, an accessory delay time value ACCDT, which delays energization of sleeper fan 31 during a sleeper unit start, especially during a heating mode, to prevent blowing cold air into the sleeper unit 30.

Step 294 checks HA switch 66 on sleeper control 50 to determine if it is on. If it is not on, step 296 calls a subroutine STOP DETERMINATION shown in FIG. 8, which sets MODE to SHUTDOWN when engine 22 should be automatically stopped. When step 294 finds that HA switch 66 is "on", step 300 checks enable flag HAM, to determine if operation of the sleeper unit environmental control has been enabled. It will be remembered that HAM is reset when ignition switch 26 is "off", and set when ignition switch 26 is "on", in steps 156 and 158 of FIG. 3A. If sleeper temperature control is not enabled, step 300 proceeds to step 296. If sleeper temperature control is enabled, step 300 proceeds to step 302, which calls a program BT CONTROL shown in FIG. 12. Program BT CONTROL, as will be hereinafter be described, resets an accessory flag ACC (logic 0) when the temperature of sleeper unit 30 is satisfied, and it sets flag ACC (logic 1) when the temperature of sleeper unit 30 is not satisfied.

Step 304 checks the condition of accessory flag ACC. If the temperature of sleeper unit 30 is satisfied, step 306 sets override flag OVD, which de-energizes the active heating or cooling accessory 32. If the temperature of sleeper unit 30 is not satisfied, step 308 determines if engine 22 was started because the temperature of sleeper unit 30 was not satisfied (ACC=1). If not, step 308 proceeds to step 296. If the engine start was a HA start, step 310 compares engine running time ERT with the accessory delay time value ACCDT, such as 90 seconds, to enable the proper temperature of air to be introduced into the sleeper unit 30. When the accessory delay time value ACCDT has reached, step 312 resets override flag OVD, to enable the heating or cooling accessory 32 selected by the user to be energized, and step 312 also energizes the bunk or sleeper unit fan 31. Step 312 then proceeds to step 296 which calls the subroutine STOP DETERMINATION shown in FIG. 8.

Figure 8:
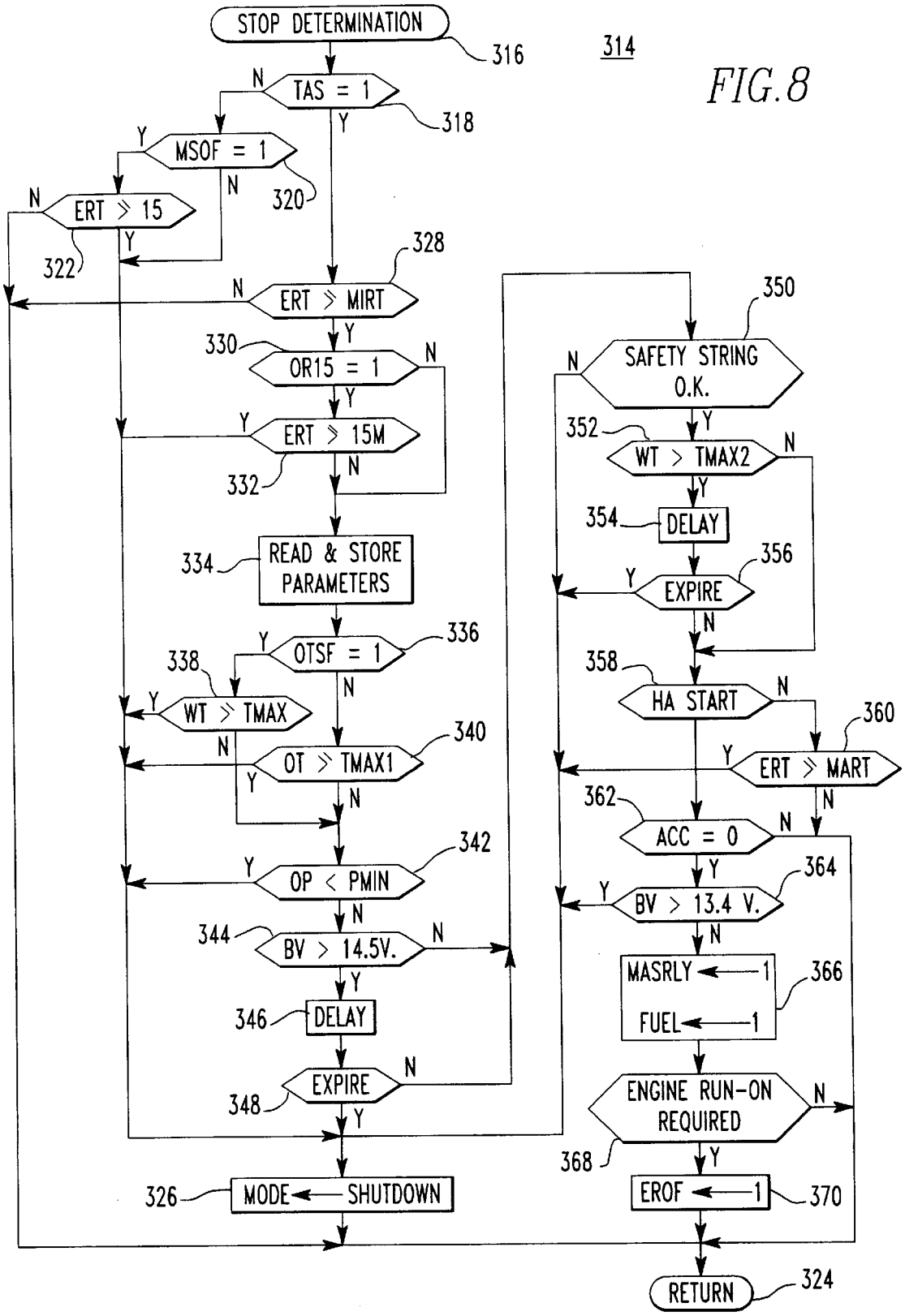
FIG. 8 is a flow diagram of a program STOP DETERMINATION, which is called by the program RUN shown in FIG. 6.

FIG. 8 is a flow diagram of a program 314 for implementing STOP DETERMINATION. Program 314 is entered at 316 and step 318 checks the condition of flag TAS to determine if automatic start-stop operation of engine 22 is enabled. If it is not enabled, step 320 checks the condition of mandatory shutdown option flag. If flag MSOF is set, engine 22 is operated for a predetermined period of time, such as 15 minutes, before shutdown, if flag MSOF is reset, nothing is done to keep engine 22 running. Thus, if flag MSOF is set, step 322 checks the engine running timer ERT to determine if the engine has been running for 15 minutes. If it has not, step 322 exits program at 324. If engine 22 has been running for 15 minutes, step 322 proceeds to step 326, which sets digital value MODE to call program SHUTDOWN in FIG. 9.

When step 318 finds that flag TAS is set, indicating enablement of the automatic start-stop mode for engine 22, step 328 compares engine running time ERT with the minimum idle time value MIRT. If engine 22 has not been running for the minimum idle time, step 328 proceeds to program exit 324. If engine 22 has been running for the minimum idle time, step 330 determines if control apparatus 34 has forced into a time operating mode for some reason, which will be hereinafter be explained, such as 15 minutes on, 15 minutes off. This is done by checking the condition of a flag OR15. If flag OR15 is set, then engine 22 is running in a scheduled timed on-timed off mode, and step 332 determines if engine 22 has been running for the programmed on time, e.g., 15 minutes. If it has, step 332 proceeds to step 326 to initiate engine shutdown.

If flag OR15 is reset, or flag OR15 is set but engine running time ERT has not reached 15 minutes, step 334 reads and stores all applicable sensor readings. Step 336 checks oil temperature sensor failure flag OTSF, and if it is set, indicating failure, step 338 compares the temperature WT of the engine coolant with a value TMAX stored in ROM 40. If the temperature WT exceeds TMAX, step 338 proceeds to step 326 to initiate engine shutdown. If step 336 finds no failure of the oil temperature sensor, step 336 proceeds to step 340 which compares the temperature TO of the engine oil with a value TMAX1 stored in ROM 40. If the temperature TO of the engine oil exceeds TMAX1, step 340 proceeds to step 326 to initiate engine shutdown.

The "no" branches of steps 338 and 340 both proceed to step 342, which compares the engine oil pressure OP with the predetermined minimum value PMIN stored in ROM 40. If the engine oil pressure OP is low, step 342 proceeds to the engine shutdown step 326. When step 342 finds engine oil pressure OP satisfactory, step 344 compares the battery voltage BV, which is actually alternator voltage, since engine 22 is running, with a predetermined maximum value, such as 14.5. If voltage BT exceeds the maximum value, steps 346 and 348 provide a delay time for voltage BV to drop below the allowable maximum value. If voltage BV is still high at the end of the delay, step 348 proceeds to the engine shutdown step 326.

The "no" branches of steps 344 and 348 both proceed to step 350 which repeats the safety string 163 of steps shown in FIG. 3A. If the safety string is not O.K., step 350 proceeds to the engine shutdown step 326. If the safety string is O.K., step 350 proceeds to step 352 which compares the temperature WT of the engine coolant with a predetermined maximum value TMAX2 stored in ROM 40. If the temperature WT exceeds TMAX2, steps 354 and 356 provide a time delay to allow the temperature WT to drop below TMAX2. If the temperature WT does not drop below TMAX2 before the expiration of the delay period, step 356 proceeds to the engine shutdown step 326.

The "no" branches of steps 352 and 356 both proceed to step 358 which determines if engine 22 was a HA start, ie., a start to satisfy sleeper unit 30. If the start was not a HA start, then the start was made to keep engine 22 in a ready-to-start mode, which is subject to the maximum running time MART. Step 360 compares engine running time ERT with value MART, and if ERT has reached MART, step 360 proceeds to engine shutdown step 326. When step 358 finds engine 22 was started to satisfy sleeper unit 30, step 362 checks the condition of accessory flag ACC. If flag ACC is set, the temperature of sleeper unit 30 has not been satisfied, and step 362 proceeds to program exit 324, allowing engine 22 to keep running. If flag ACC is found to be reset in step 362, indicating the temperature of sleeper unit 30 has been satisfied, step 364 compares voltage BV with a predetermined minimum value, such as 13.4 volts, to determine if it is O.K. to shut engine 22 down. If the battery voltage BV does not exceed 13.4 volts, restart ability is questionable, and step 366 assures that engine 22 will keep running by keeping the output MASRLY to master relay 48 high, and by keeping the output FUEL to the fuel relay high. Step 368 then determines if engine run-on is required for any other purpose, and if so, step 370 sets an engine run-on flag EROF. If engine run-on is not required, step 368 proceeds to program exit 324, as does step 370.

Figure 9:
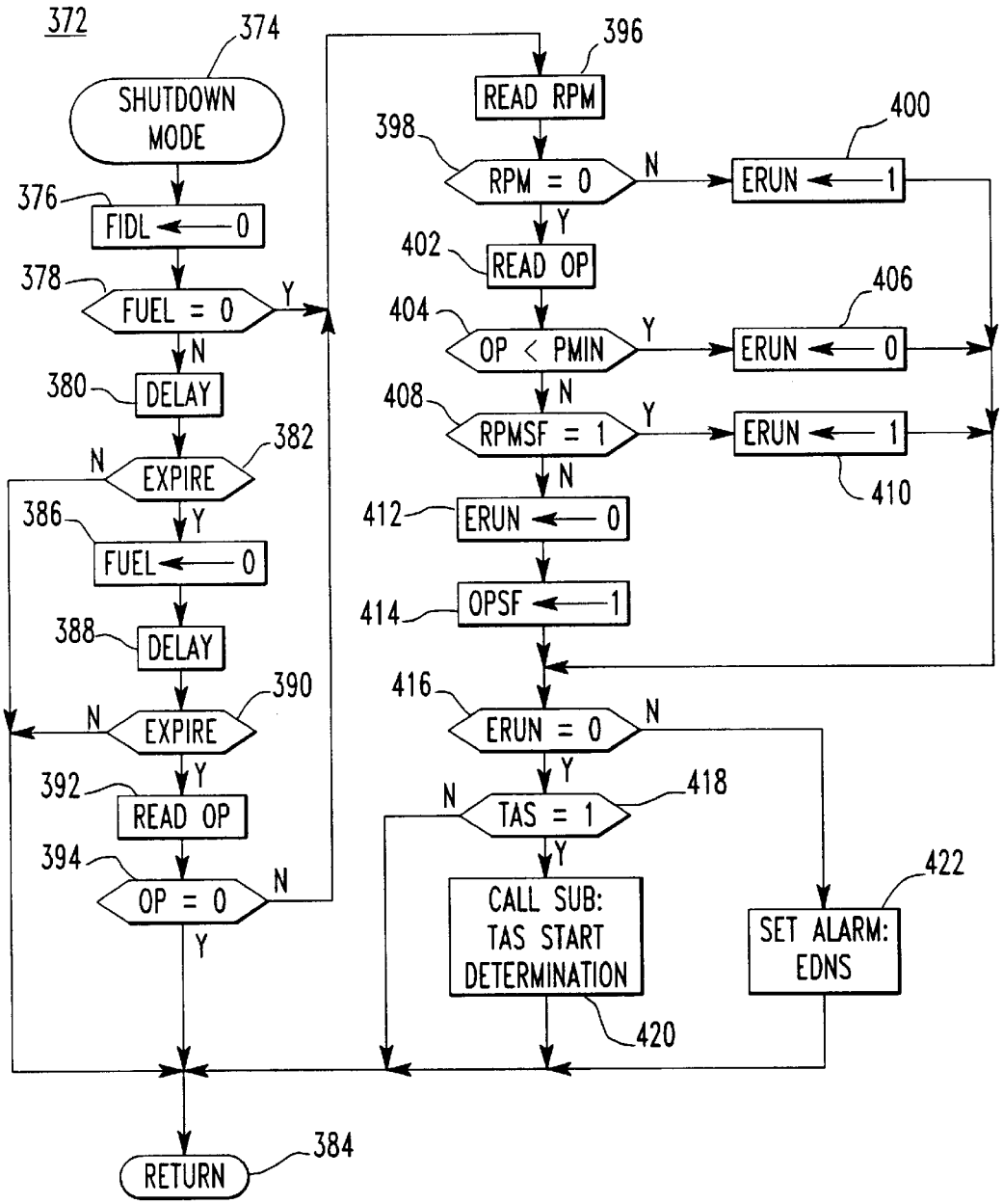
FIG. 9 is a flow diagram of a program SHUTDOWN, which is called by the program STOP DETERMINATION shown in FIG. 8.

When step 326 sets the digital value MODE to indicate the SHUTDOWN program shown in FIG. 9 is required, it will be run by step 230 in FIG. 3B. FIG. 9 is a flow diagram of a program 372 which implements program SHUTDOWN. Program 372 is entered at 374 and step 376 sets the fast idle output FIDL to zero. Step 378 determines if the output FUEL to the fuel relay is zero. At this point it will not be zero, and steps 380 and 382 provide the required delay between termination of fast idle control and shutdown, such as 30 seconds. Step 382 exits program at 84 until the delay expires, at which time step 386 sets output signal FUEL to zero. Steps 388 and 390 initiate a delay for oil pressure to drop, and when step 390 detects expiration of the time delay, step 392 reads engine oil pressure OP. If step 394 finds engine oil pressure is zero, program 372 exits at 384.

Step 394 proceeds to step 396, as does step 378 when step 378 finds output signal FUEL is equal to zero. Step 396 reads the engine RPM and step 398 determines engine RPM is zero. If engine RPM is not zero, step 400 sets a flag ERUN, to indicate that engine 22 is running. When step 398 finds the engine RPM is zero, step 402 reads engine oil pressure OP. If the oil pressure is below the predetermined minimum PMIN, as determined in step 404, step 406 resets engine flag ERUN, to indicate engine 22 is not running. If step 404 finds significant engine oil pressure, step 408 checks the condition of RPM sensor fail flag RPMSF. If the RPM sensor has failed, step 410 sets engine flag ERUN, to indicate engine 22 is running. If step 408 finds the RPM sensor has not failed, step 412 resets engine flag ERUN, to indicate engine 22 is not running. Step 414 then sets the oil pressure sensor fail flag, to indicate failure of the oil pressure sensor failure.

Steps 400, 406, 410 and 414 all proceed to step 416 which checks the condition of engine flag ERUN. If flag ERUN is set, step 422 sets an alarm EDNS, which results in a red indicator lamp 67 on display 44 being illuminated, indicating that engine 22, while shut down by the control apparatus 34, did not actually stop.

Figure 10:
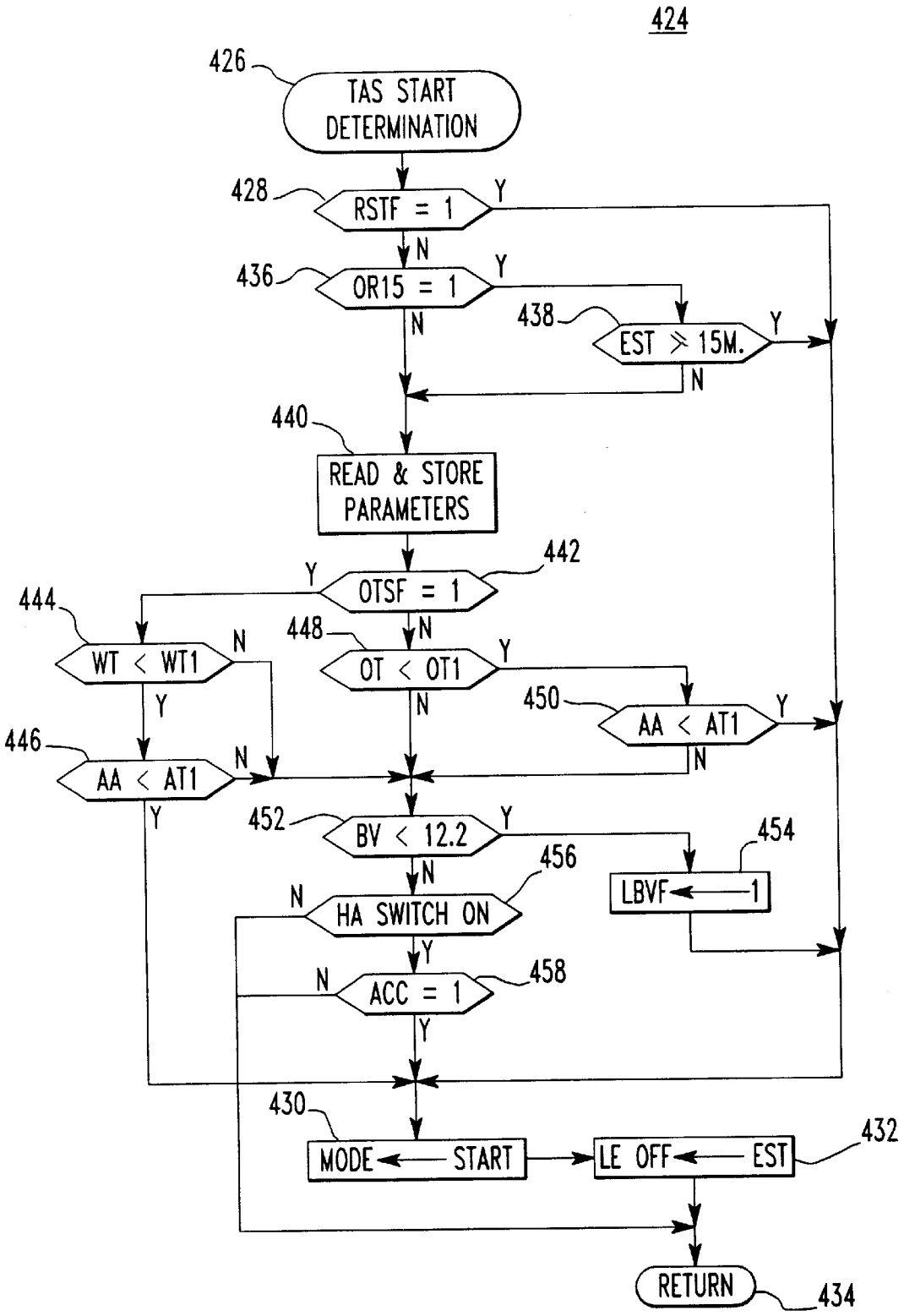
FIG. 10 is a flow diagram of a program TAS START DETERMINATION, which is called by the program SHUTDOWN shown in FIG. 9.

When step 416 finds flag ERUN reset, indicating that engine 22 is shutdown, step 418 checks flag TAS to determine if engine 22 is enabled for automatic starts. If flag TAS is reset, step 418 exits program 372 at 384. If flag TAS is set, step 420 calls a subroutine TAS START DETERMINATION, shown in FIG. 10. FIG. 10 is a flow diagram of a program 424 which implements program TAS START DETERMINATION. Program 424 is entered at 426 and step 428 checks the condition of the engine re-start flag RSTF, which may be set by program BUNK FAN OPTION in FIG. 15, for example, or any other program which for some reason should require engine 22 to start. If restart flag RSTF is set, step 430 sets the digital value MODE to indicate that program START of FIG. 11 should be run. Step 432 stores the length of the engine stop time at a location LEOFF, which always contains the length of the last engine stop cycle, and program 424 exits at 434.

When step 428 finds flag RSTF reset, step 436 checks the condition of flag OR15. If flag OR15 is set, as hereinbefore explained, engine 22 has been placed on a timed on-off schedule, such as 15 minutes on, and 15 minutes off. If step 436 finds that flag OR15 is set, step 438 determines if the engine stop time EST has reached the scheduled off time, e.g., 15 minutes. If it has, step 438 proceeds to the hereinbefore described steps 430 and 432.

The "no" branches of steps 436 and 438 both proceed to step 440 which reads and stores all appropriate sensor readings, and sensor failure flags, to determine if engine 22 should be started to keep it in a ready-to-start condition. Step 442 checks the condition of oil temperature sensor failure flag OTSF. If the oil temperature sensor has failed, step 444 compares the temperature WT of the engine coolant with a predetermined low temperature value WT1 stored in ROM 40. If the engine coolant temperature is less than WT1, step 446 determines if the ambient temperature AA is below a value AT1 stored in ROM 40. If the coolant temperature is below WT1 and the ambient temperature is below AT1, engine 22 should be started, and step 446 proceeds to the engine start step 430.

When step 442 finds the oil temperature sensor operational, step 448 compares the temperature OT of the engine oil with a minimum value OT1 stored in ROM 40. If the temperature OT is less than OT1, step 450 compares the ambient temperature AA with the predetermined minimum value AT1. If step 450 finds the temperature AA to be less than AT1, step 450 proceeds to the engine start up step 430.

The "no" branches of steps 444, 446, 448 and 450 all proceed to step 452 which compares the battery voltage BV with a predetermined minimum value, such as 12.2 volts. If the battery voltage BV is less than 12.2 volts, step 454 sets a low battery voltage flag LBVF, and step 454 proceeds to the engine start-up step 430.

When step 452 finds that the battery voltage BT is sufficient to assure start-up, step 452 proceeds to step which checks HA switch 66. If HA switch 66 is off, step 456 proceeds to program exit 434. If HA switch 66 is on, step 456 proceeds to step 458 which checks flag ACC. If flag ACC is set, it indicates the temperature of sleeper unit 30 is not satisfied, and step 458 proceeds to engine start-up step 430. If step 458 finds flag ACC is reset, the temperature of sleeper unit 30 is satisfied and step proceeds to program exit 434.

Figure 11:
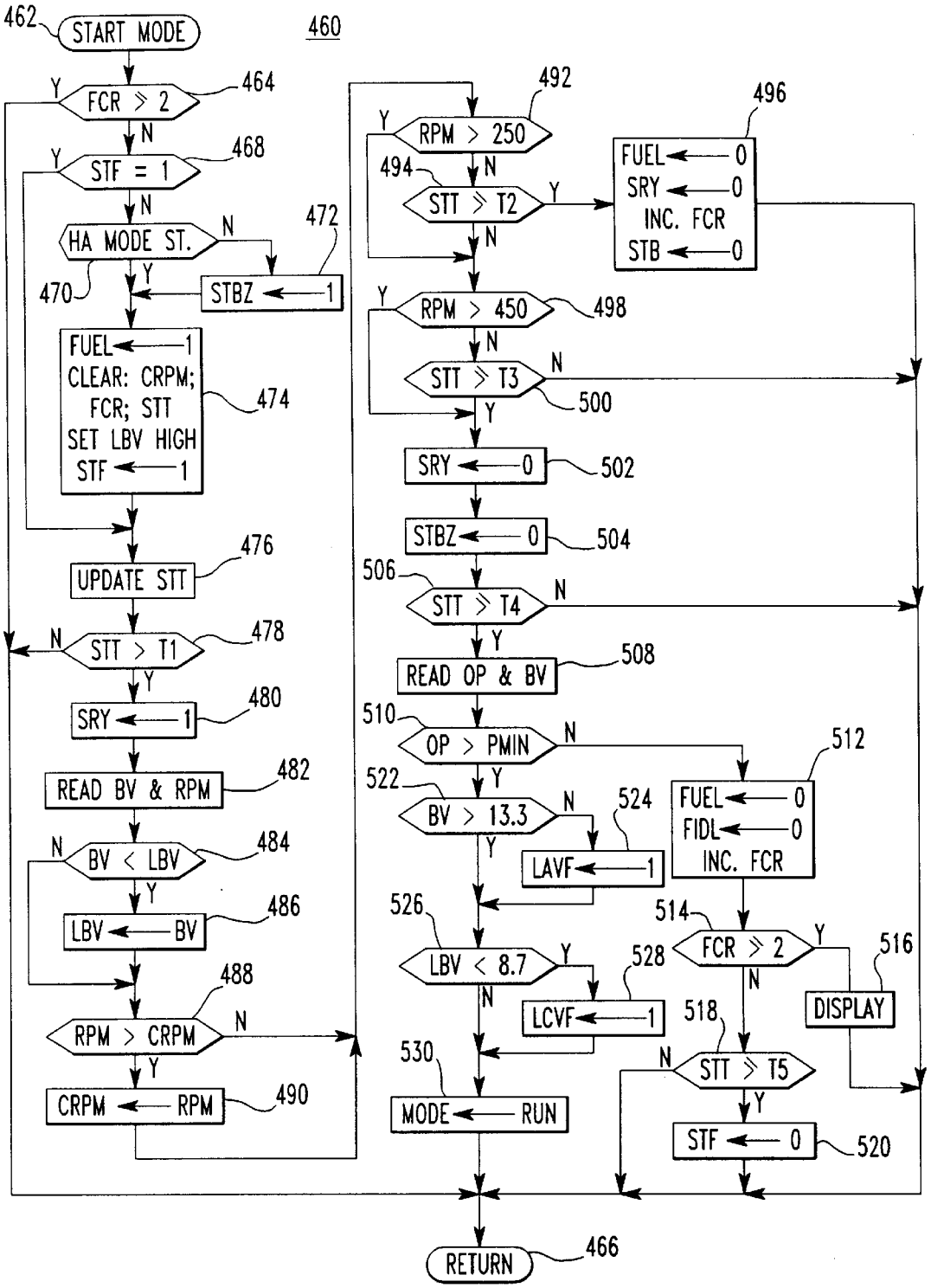
FIG. 11 is a flow diagram of a program START, which is called by the program TAS START DETERMINATION, shown in FIG. 10.

When program 424 sets MODE to a digital value of to indicate that program START should be run, program START will be run the next time that step 230 of FIG. 3B is run. FIG. 11 is a flow diagram of a program 460 which implements program START. Program 460 is entered at 462 and step 464 checks a start failure counter FCR. If counter FCR is equal to, or greater than some predetermined value, such as 2, it indicates that engine 22 has failed to start on two successive attempts, and further starts should not be attempted. Thus, step 464 proceeds to program exit if the predetermined count has been reached.

When failure counter FCR has not reached 2, step 468 checks the condition of an initializing start flag STF. When flag STF is reset, it indicates that the engine start program 460 has not been initialized, and step 470 determines if the start is being made satisfy the sleeper unit 30. If not, then the start is being made to maintain engine 22 in a ready-to-start mode, and a step 472 sets an output signal STBZ high, which energizes a buzzer in the engine compartment, to warn that an engine start is imminent.

The "yes" branch of step 470, and step 472, both proceed to step 474, which sets the output FUEL to the fuel relay to a logic one, it clears a start timer STT, it sets a location LBV which stores the lowest battery voltage during cranking to all logic ones, and it clears a location CRPM which stores the highest cranking speed during cranking. Step 474 also sets start flag STF so steps 470, 472 and 474 are skipped on subsequent runs of program 460.

Step 476 updates the start timer STT. Step 478 determines if the start timer STT has reached a value T1 stored in ROM 40, exiting program 460 until time T1 has been reached. Time T1 provides time for fuel relay to pick up. When step 478 finds that time delay T1 has been reached, step 480 sets the output SRY to the starter relay high to start engine cranking. Step 482 reads the battery voltage and engine RPM. Step 484 compares the battery voltage with the value stored at the lowest battery voltage storage location LBV in RAM, and if voltage BV is lower than the value stored at this location, step 486 stores reading BV at location LBV. Since location LBV was set to logic ones in step 474, the first battery voltage reading will be stored.

The "no" branch of step 484 and step 486 both proceed to step 488 which compares engine RPM with the value stored at location CRPM. If engine RPM exceeds the value stored at CRPM then step 490 stores the engine RPM at location CRPM. Since location CRPM was set to logic zeros in step 474, the first RPM reading will be stored. Steps 488 and 490 both proceed to step 492. Step 492 compares engine RPM with a predetermined low value, such as 250 RPM, which should be achieved by a predetermined minimum cranking time T2, as determined in step 494. If the engine RPM does not exceed 250 by the expiration of the minimum cranking time T2, step 496 sets the output FUEL to the fuel relay to zero, it sets the output SRY to the starter relay to zero, to terminate engine cranking, and it increments the failure counter FCR. Program 460 then exits at 466.

If the engine start passes the first RPM-time test of steps 492 and 494, steps 498 and 500 perform a second RPM-time test, determining if engine speed exceeds a higher value, such as 450 RPM by the end of a maximum cranking time period T3. If engine speed reaches 450 before expiration of time T3, the output SRY to the starter relay is zeroed in step 502, and if time T3, the maximum crank time, expires before engine speed reaches 450 RPM, step 502 also terminates cranking. Step 504 terminates the warning buzzer, if active, by setting output STBZ to zero.

Step 506 then determines if the start timer STT has reached a value T4, which provides time for oil pressure to build, in case engine 22 has started properly. After expiration of time T4, step 508 reads engine oil pressure OP and battery voltage BV. Step 510 compares engine oil pressure OP with the predetermined minimum value PMIN, and if it does not exceed this minimum value, step 512 sets output FUEL to the fuel relay to zero and it also increments the failure counter FCR. Step 514 determines if the failure count has reached 2. If so, step 516 illuminates an alarm lamp 67 on display 44, and program 460 exits at 466.

When step 514 finds the failure count has not reached 2, step 518 compares the start timer value STT with a time delay T5 selected to provide a predetermined time delay between engine start attempts. When time delay T5 expires, step 520 resets start flag STF, which will enable a re-start attempt to be made the next time step 468 is encountered.

When step 510 finds engine oil pressure OP is O.K., step 522 compares the battery voltage BV with a predetermined minimum acceptable value, such as 13.3 volts, and if voltage BV does not exceed this minimum value, step 524 sets a low alternator voltage flag LAVF. The "yes" branch of step 522 and step 524 both proceed to step 526 which determines if the lowest battery voltage during cranking was less than a predetermined value, such as 8.7 volts. If the stored value LBV is less than 8.7, step 528 sets a low cranking voltage flag LCVF.

The "no" branch of step 526 and step 528 both proceed to step 530 which sets the binary value MODE to indicate that the program RUN of FIG. 6 should be run next.

Figure 12:
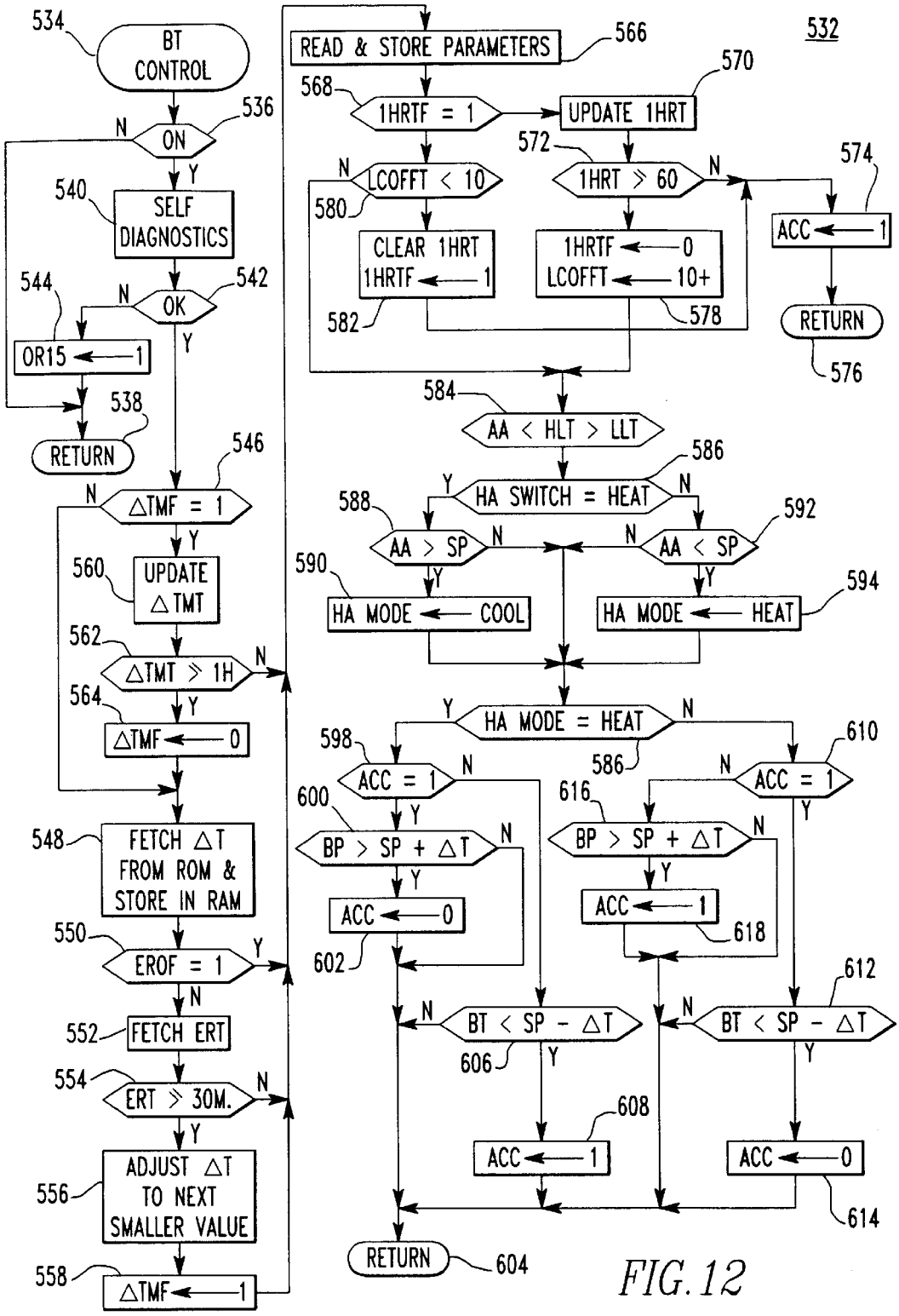
FIG. 12 is a flow diagram of a program BT CONTROL which implements the temperature control of [the "bunk" or sleeper unit] *an interior portion* of the associated [truck] *vehicle*, and which is called by the program RUN shown in FIG. 6.
Figure 13:
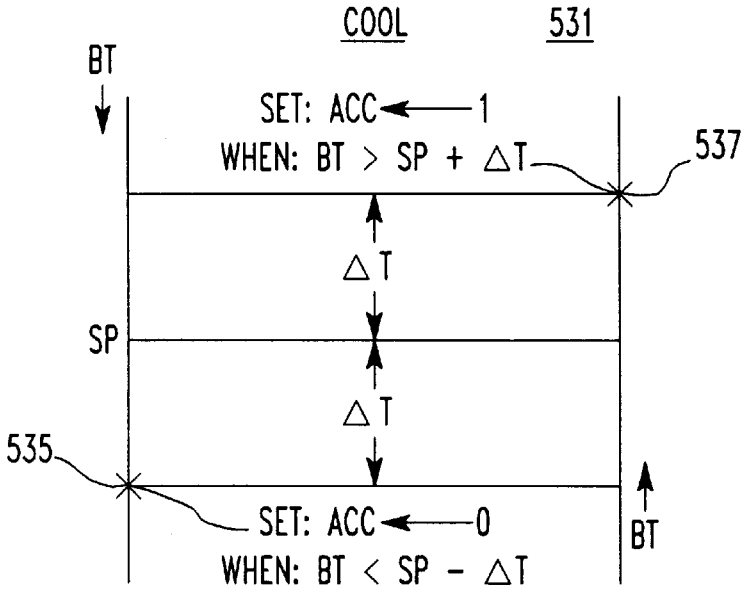
FIG. 13 is an algorithm used by the program BT CONTROL shown in FIG. 12 during a cooling mode.
Figure 14:
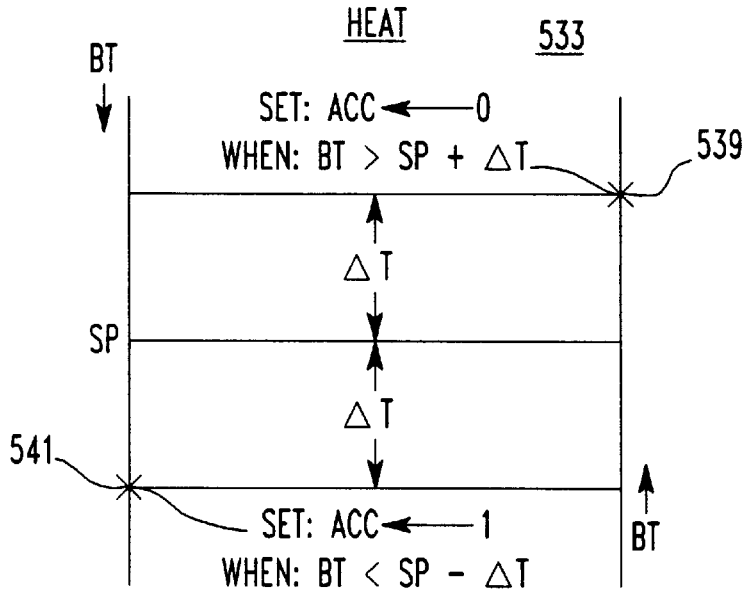
FIG. 14 is an algorithm used by the program BT CONTROL shown in FIG. 12 during a heating mode.

FIG. 12 is a flow diagram of a program BT CONTROL, which is called by step 302 of program RUN shown in FIG. 6. FIGS. 13 and 14 illustrate control algorithms 531 and 533 for cooling and heating modes, respectively, which will be referred to during the description of program 534. A falling bunk temperature is indicated along the left-hand side of the control algorithms, and a rising bunk temperature is indicated along the right-hand side of the control algorithms. A dead band ΔT is indicated above and below set point temperature SP, with the dead band indicating the range about set point SP where the temperature of sleeper unit 30 is satisfied. When the temperature of sleeper unit 30 is above or below the dead band, then the temperature of sleeper unit 30 is not satisfied.

As indicated in algorithm 531 for the cooling mode in FIG. 13, the temperature of sleeper unit is driven downwardly along the left-hand side until reaching point 535, at which point flag ACC is set to zero, to indicate the temperature of sleeper unit 30 is satisfied. Point 535 is reached when the bunk temperature BT is less than the difference between set point SP and the dead band ΔT, i.e., BT<SP−ΔT. With engine 22 off, the temperature side of algorithm 531 until point 537 is reached, at which point flag ACC is set to logic one, to indicate the temperature of sleeper unit 30 is no longer satisfied. This is signified by BT>SP+ΔT.

As indicated in algorithm 533 for the heating mode in FIG. 14, the temperature of sleeper unit is driven upwardly along the right-hand side until reaching point 539, at which point flag ACC is set to zero, to indicate the temperature of sleeper unit 30 is satisfied. Point 539 is reached when the bunk temperature BT is greater than the sum of the set point temperature SP and the dead band ΔT, ie., BT>SP+ΔT. With engine 22 off, the temperature of sleeper unit 30 then starts to fall along the left-hand side of algorithm 533 until point 541 is reached, at which point flag ACC is set to logic one, to indicate the temperature of sleeper unit 30 is no longer satisfied. This is signified by BT<SP−ΔT.

Program 534 is entered at 534 and step 536 checks HA switch 66 to determine if sleeper unit temperature control is "on". If not, program 532 exits at 538. When step 536 finds HA switch 66 is in an "on" position, selecting either heat or cool, step 540 runs a self diagnostic program to determine if it is functional to the point of being able to accurately control the temperature of sleeper unit 30. Step 542 checks a failure flag set by step 540 when a failure is detected. If this failure flag is set, step 544 sets flag OR15, to place engine 22 on the hereinbefore mentioned timed on-timed off schedule, such as 15 minutes on, and 15 minutes off. Step 544 proceeds to program exit 538.

When step 542 finds program 532 operational, step 546 checks a flag ΔTMF to determine if the stored dead band value has been changed by this program to some more suitable value. Any such change is reset back to the original value after a predetermined period of time, such as one hour. If step 546 finds that flag ΔTMF is reset, indicating that no change has been made in the dead band, step 546 proceeds to step 548 which fetches the ΔT dead band value stored in ROM 40 and stores it in RAM 42 for use by this program.

Step 550 checks the condition of the engine run-on flag EROF to determine if engine 22 is being maintained in a run-on state. If step 550 finds flag EROF is reset, the run-on state is not active, and step 552 fetches the engine running time from engine running timer ERT. Step 554 compares ERT with a predetermined maximum desirable running time, such as 30 minutes. If engine 22 has been running for 30 minutes, program 532 takes steps to cut down on the running time of the next engine run cycle, by adjusting the dead band value ΔT to the next smaller value in step 556. For example, if ΔT is currently at the default value of 5° F., step 556 would adjust ΔT to the next smaller value of 4° F., storing this new value in RAM 42 in place of the value obtained from ROM 40. Step 558 then sets flag ΔTMF.

The next time step 546 is reached, it will now find flag ΔTMF set, and step 560 updates timer ΔTMT. Step 562 determines when the modification time, such as one hour, has expired. When the modification time has expired, step 564 resets modification flag ΔTMF, so that on the next running of program 532, step 548 will obtain the dead band value from ROM 40 and store it in RAM 42.

The "no" branches of steps 562 and 554, the "yes" branch of step 550, and step 558, all proceed to step 566 Which reads and stores all necessary parameters. Step 568 starts a portion of program 532 which causes engine 22 to run continuously for a predetermined period of time, such as one hour, when the last cycle off time was last than a predetermined short period of time, such as 10 minutes. Step 568 checks the condition of a modification flag 1HRTF. If this flag is set, it indicates that engine 22 is in this one hour continuous-run condition. Step 570 updates timer 1HRT and step 572 determines if the one hour time period has expired. When step 572 finds that the one hour time period has not expired, step 574 keeps flag ACC set, to indicate that sleeper unit is not satisfied, which will keep engine 22 running. Step 574 exits program 532 at 576. When the one hour time period expires, step 578 resets flag 1HRTF, and it sets storage location LCOFFT to a value exceeding 10 minutes, eg., all logic ones.

When step 568 finds that flag 1HRTF is reset, there is no continuous run modification in effect, and step 580 compares the last cycle off time LCOFFT to see if it was less than 10 minutes. If it was, timer 1HRT is cleared, and flag 1HRTF is set, to initiate the one hour continuous run modification. When step 580 finds that the last cycle off time was not less than 10 minutes, it proceeds to step 584, as does step 578.

Step 584 determines if the ambient temperature is less than the high temperature limit HLT and greater than the low temperature limit LLT. If the ambient temperature AA is not between these limits, then engine 22 should be run continuously until the ambient temperature returns to this range. Thus, the "no" branch proceeds to step 574, to set flag ACC to indicate that the sleeper temperature is not satisfied. When the ambient temperature is in the range between the low and high limits LLT and HLT, step 584 proceeds to step 586.

Step 586 determines the position of HA switch 66. When HA switch 66 is selecting the heat mode a location HAMODE is set to "heat". When HA switch 66 is set to select the cool mode, location HAMODE is set to "cool". Program 532 now enters a phase to determine if control apparatus is being "fooled" into running continuously. If HAMODE is set to "heat", step 588 determines if the temperature AA of the ambient air is above set point. If it is, this relationship is not consistent with the heat mode selected by HA switch 66 and step 590 changes HAMODE to "cool", notwithstanding the selection of the heat mode by HA switch 66. If step 588 finds that the temperature AA of the ambient air is not greater than the set point temperature, this relationship is consistent with the selected heat mode. Thus, HAMODE is left in the selected "heat" mode, and step 588 proceeds to step 596.

In like manner, when step 586 finds that HA switch 66 is selecting the cool mode, step 592 determines if the temperature AA of the ambient air is less than the set point temperature SP. If it is, the system is being "fooled" into running continuously, and step 594 changes the HAMODE from the selected "cool" mode to the "heat" mode. If the cool selection is consistent with the ambient temperature AA versus set point selection, step 592 proceeds to step 596.

Program 532 now proceeds to a portion of the program which executes the two control algorithms 531 and 533 shown in FIGS. 13 and 14. Step 596 determines the mode requested by HAMODE. When this mode is heat, step 598 determines if the temperature of sleeper unit 30 is satisfied. If it is not satisfied, step 600 looks for the bunk temperature BP reaching the point SP+ΔT, ie., point 539 in the algorithm 533 of FIG. 14. When step 600 detects this point, step 602 resets flag ACC to zero, to indicate that the temperature of sleeper unit 30 is satisfied. Before point 539 is reached, step 600 exits program 532 at 604.

When step 598 finds that ACC is a logic zero, indicating that the temperature of sleeper unit 30 is satisfied, step 606 looks for point 541 to be reached, ie., BT<SP−ΔT. When this occurs step 608 sets ACC to logic one, and the program exits at 604. Until this point is reached, step 606 exits at 604.

When step 596 determines that the mode requested by HAMODE is cool, step 610 determines if the temperature of sleeper unit 30 is satisfied. If it is not satisfied, step 612 looks for the bunk temperature BP reaching the point SP−ΔT, ie., point 535 in the algorithm 531 of FIG. 13. When step 612 detects this point, step 614 resets flag ACC to zero, to indicate that the temperature of sleeper unit 30 is satisfied. Before point 539 is reached, step 612 exits program 532 at 604.

When step 610 finds that ACC is a logic zero, indicating that the temperature of sleeper unit 30 is satisfied, step 616 looks for point 537 to occur, ie., BT>SP+ΔT. When this occurs step 618 sets ACC to logic one, and the program exits at 604. Until this point is reached step 616 exits program 532 at 604.

Figure 15:
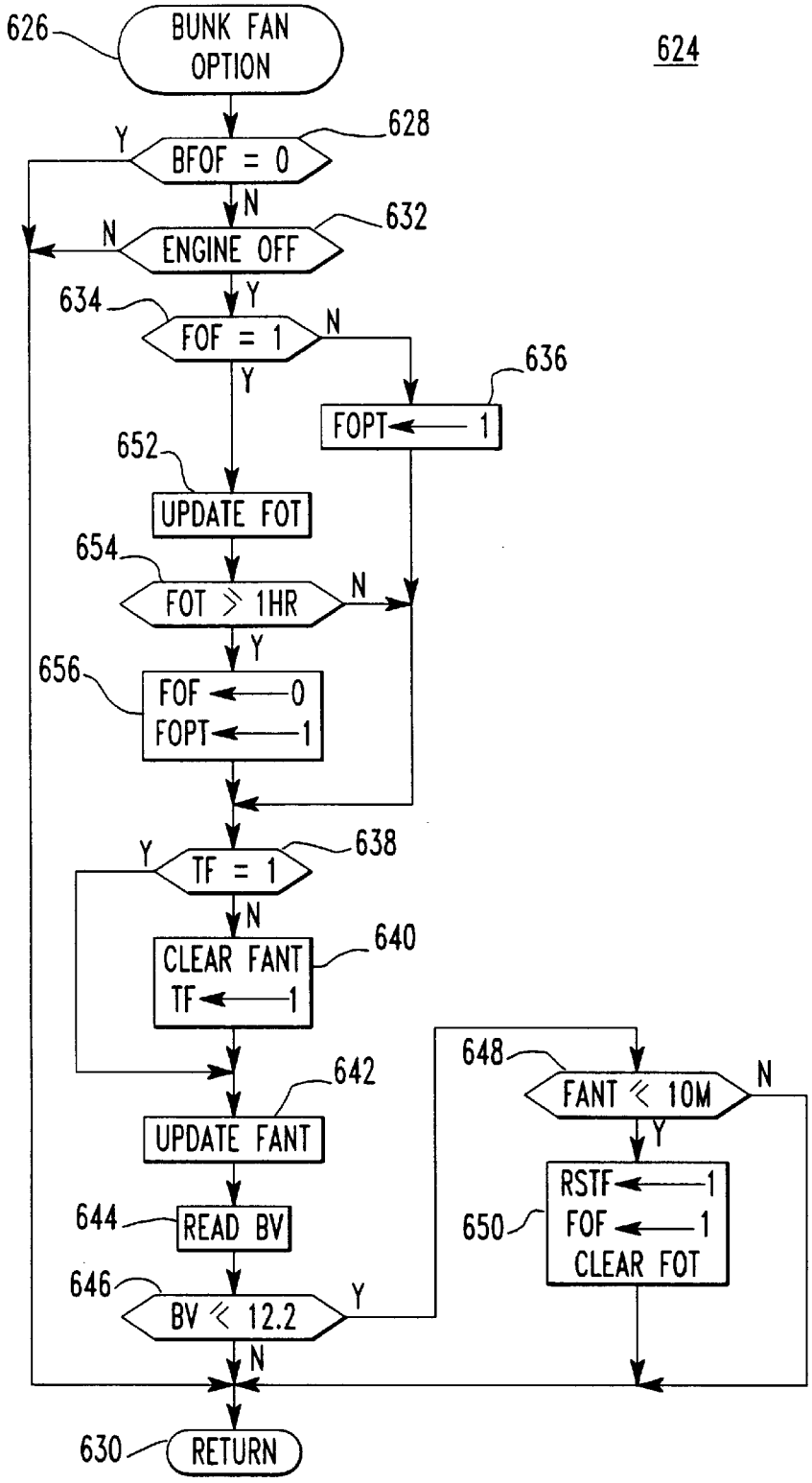
FIG. 15 is a flow diagram of a program which illustrates a bunk or sleeper unit fan option which may be selected, or rejected, during the [operation of the guarded access program] *parameter selection* shown in FIG. 2, which, when selected, runs a sleeper unit fan off the truck battery when the truck engine is off.

FIG. 15 is a flow diagram of a program 624 which implements the bunk fan option referred to in step 94 of FIG. 2. The bunk or sleeper fan option, when selected, enables a user to run the sleeper fan 31 off battery 24 during an engine off cycle. Program 624 is entered at 626 and step 628 checks the bunk fan option flag BFOB which is set in step 96 when the option is selected, and reset in step 98 when the option is not selected. When the option is not selected, step 628 exits program at 630. When the option is selected, step 628 proceeds to step 632 which determines if engine 22 is running. If engine 22 is not running, program 624 exits at 630. When step 632 finds engine 22 running, step 634 checks a fan-off fan FOF. At this point of the program, fan FOF will be reset and step 636 sets a fan output signal FOPT high, which energizes sleeper fan 31.

A fan timer FANT is started when fan 31 is energized, with step 638 checking a timer flag TF to determine if timer fan FANT has been initialized. At this point in the program, flag TF will be reset and step 640 clears timer FANT and sets timer flag TF. Step 642 updates timer FANT.

Steps 646 and 648 determine if the battery voltage BV drops below a predetermined low value, such as 12.2 volts, within a predetermined operating time, such as 10 minutes. Step 646 compares the battery voltage BV with it detects the battery voltage BV dropping below 12.2. If this low battery voltage condition occurs, step 648 compares the time accumulated on fan timer FANT with a predetermined value, eg., 10 minutes. If this low battery condition occurred in 10 minutes or less, step 650 sets engine restart flag RSTF true, and flag-off flag FOF is set. If the low battery voltage did not occur within 10 minutes after fan 31 was energized, step 648 proceeds to program exit 630.

The next running of TAS START DETERMINATION program 424 in FIG. 10 will find restart flag RSTF set in step 428, and engine 22 will re started. Fan 31 will then not be operated during at least the next engine off cycle. This may be accomplished by counting engine off cycles, precluding operation of fan 31 until a predetermined number of off cycles have been run. This may also be accomplished as shown in FIG. 15 by starting a fan off timer FOT, which is cleared in step 650. The next time step 634 is encountered it will find fan off flag FOF set and step 652 updates the fan off timer FOT. Step 654 compares the time on timer FOT with a predetermined period of time, such as one hour, during which time fan 31 will not be run off battery 24 during an engine off cycle. An hour delay in allowing fan 31 to operate off battery 24, starting when restart flag RSTF is set in step 650, will cover at least one engine off cycle, and probably two. Step 654 advances to step 638 until the delay period has expired, at which point step 654 goes to step 656 which resets the fan off flag FOF, and it sets the fan output signal FOPT high, to again energize fan 31.

FIG. 16 is a flow diagram of a program 660 which implements SENSOR OPTION, which was previously mentioned at step 100 of program 72 shown in FIG. 2. This program is useful for detecting when the sleeper temperature sensor 70, which reports the magnitude of the bunk or sleeper temperature BT, may be deliberately placed outside sleeper unit 30 in an attempt to operate engine 22 continuously. Program 660 is entered at 662 and step 664 determines if engine 22 is running. If engine 22 is not running, program 660 exits at 666. When step 664 finds engine 22 running, an optional step 668 determines if the set point selector 68 has been set to a value which is outside a normal comfort temperature zone or range, such as 60° F. to 80° F.. If set point selector 68 is within this normal comfort temperature zone, program 660 may exit at 666.

When set point selector 68 has been moved outside this normal comfort temperature zone, step 670 reads and stores the ambient temperature AA and the temperature BT being reported by the temperature sensor 70, which sensor is supposed to be physically located within the confines of the sleeper unit 30. Step 672 determines if the temperature BT is in a plausible range. If it is not in a plausible range, step 672 proceeds to step 674 which sets flag OR15 and the program exits at 666. The setting of flag OR15 overrides normal thermostat temperature control of sleeper unit 30, causing engine 22 to be operated in a predetermined on-off schedule, such as 15 minutes on, and 15 minutes off.

When step 672 finds that signal BT from temperature sensor 70 is in a plausible range, step 676 determines if the absolute difference between the temperature BT being reported by sensor 70 and the ambient temperature AA is equal to or less than a predetermined small value, such as 5° F. If not, step 677 resets a timer flag TFLG and program 660 exits at 666. If the difference between these two temperatures is 5° F. or less, steps 678, 680, 682 and 684 determine if this condition exists continuously for a predetermined period of time, such as 15 minutes. If this condition persists for this length of time, in all probability sensor 70 has been placed in the ambient, in an attempt to operate engine continuously.

More specifically, step 678 checks the timer flag TFLG, and if reset, step 680 clears a timer STTR and sets flag TFLG. Step 682 updates timer STTR and step 684 compares the time on timer STTR with the predetermined period of time, such as 15 minutes. If the temperature difference stays within the small temperature range for 15 minutes, step 676 will always follow the path to step 678, and step 684 will branch to step 674 at the end of 15 minutes to set the programmed engine on-off time flag OR15. Thus, an attempt to cause engine 22 to run continuously will cause engine 22 to run in the programmed on-off mode.

We claim:

1. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

selecting predetermined system parameters via a password accessible interactive program, providing first switch means for selecting an automatic engine start-stop operating mode, providing second switch means for selecting an automatic temperature control mode for the truck sleeper unit, providing safety means which indicates when the truck engine may be safely operated in the automatic engine start-stop operating mode, overriding the ignition switch control of the engine in response to a predetermined condition when the first switch means selects the automatic operating mode and the safety means indicates the truck engine may be safely operated in the automatic operating mode, starting and stopping the engine automatically while the ignition switch control of the engine is being overridden by the overriding step, to maintain the engine in a ready-to-start condition, regardless of the selection of the second switch means, starting and stopping the engine automatically while the ignition switch control of the engine is being overridden by the overriding step, to maintain the engine in a ready-to-start condition, and to control the temperature of the sleeper unit, when the second switching means selects automatic temperature control, terminating the overriding step in response to a predetermined condition, restoring ignition switch control of the engine, and preventing automatic re-starting of the engine while the ignition switch is in control of the engine.

2. The method of claim 1 wherein the step of overriding the ignition switch includes the step of disconnecting the ignition switch controlled electrical loads from the battery.

3. The method of claim 1 wherein the step of overriding the ignition switch overrides the ignition switch regardless of the position of the ignition switch.

4. The method of claim 3 including the steps of:

enabling temperature control of the sleeper unit when the ignition switch is in the on position, and disabling temperature control of the sleeper unit when the ignition switch is in the off position.

5. The method of claim 1 wherein the step of overriding the ignition switch is additionally responsive to the position of the ignition switch, overriding the ignition switch only when the ignition switch is in the on position.

6. The method of claim 1 including the step of enabling stopping of the engine by the ignition switch immediately after the step of terminating the overriding step.

7. The method of claim 1 including the step of delaying stopping of the engine by the ignition switch for a predetermined period of time after the step of terminating the overriding step.

8. The method of claim 1 wherein the step of overriding ignition switch control of the engine in response to a predetermined condition includes the step of enabling the overriding step, and initiating a timing period when the step of overriding ignition switch control is enabled, with the predetermined condition which initiates the overriding step being the expiration of the timing period.

9. The method of claim 1 wherein the step of overriding ignition switch control of the engine in response to a predetermined condition includes the step of determining if the engine is running, with the predetermined condition being a finding that the engine is running.

10. The method of claim 1 wherein the predetermined condition which initiates the termination of the overriding step is a change in the first switching means to non-selection of the automatic operating mode.

11. The method of claim 1 wherein the step of selecting predetermined system parameters includes the steps of:

determining if the engine is an electronic fuel injected engine, determining the number of control relays used for engine control when the engine is an electronic fuel injected engine, storing a predetermined parameter of the engine for a predetermined relay of an electronic fuel injected engine, starting the engine when it is stopped in response to predetermined conditions, and using the stored parameter of the engine in the step of starting the engine.

12. The method of claim 1 wherein the step of selecting predetermined system parameters includes the steps of:

calibrating the measurement of engine speed (RPM) of the engine, said calibrating step including the steps of running the engine at a predetermined RPM, and storing an indication that the truck is running at the predetermined RPM, starting the engine when it is stopped, in response to predetermined conditions, and using calibrated RPM measurements of engine speed during the step of starting the engine.

13. The method of claim 1 wherein the step of selecting predetermined system parameters includes the steps of:

initializing battery voltage measurement, said initializing step including the step of providing an offset value by which a measured battery voltage is to be modified, starting, running and stopping the engine in response to predetermined conditions, measuring the battery voltage in response to predetermined conditions during the steps of starting, running and stopping the engine, modifying the battery measurements with the offset value, and using the modified battery measurements in the steps of starting, running, and stopping the engine.

14. The method of claim 1 wherein the step of selecting predetermined system parameters includes the step of selecting a dead band value about a selected set point temperature which will initiate starting and stopping of the engine, for controlling the temperature of the truck sleeper unit.

15. The method of claim 14 wherein the step of selecting predetermined system parameters includes the step of selecting upper and lower ambient temperature limits, and including the steps of:

measuring ambient temperature, comparing the measurement of ambient temperature with the selected upper and lower ambient temperature limits, and operating the engine continuously while the comparison step indicates that the measured ambient temperature is outside the selected upper and lower limits.

16. The method of claim 1 wherein the step of electing predetermined system parameters includes the step of selecting a dead band value about a selected set point temperature which will initiate starting and stopping of the engine for controlling the temperature of the truck sleeper unit, and including the steps of:

measuring the running time of the engine when running to drive the temperature of the sleeper unit to a dead band value, and modifying the selected dead band value to predetermined smaller value when the measured running time exceeds a predetermined value.

17. The method of claim 16 including the step of resetting the dead band value to the selected value after a predetermined period of time.

18. The method of claim 1 wherein the step of controlling the temperature of the sleeper unit includes the steps of starting and stopping the engine to maintain the temperature of the sleeper unit within a predetermined dead band range of a selected set point temperature, measuring engine off time, and running the engine continuously for a predetermined period of time when a measured engine off time is less than a predetermined value.

19. The method of claim 1 wherein the step of selecting predetermined system parameters includes the step of selecting a dead band value about a selected set point temperature which will initiate starting and stopping of the engine according to predetermined cooling and heating control algorithms, and including the steps of:

manually selecting one of heat and cool conditioning modes, manually selecting a set point temperature, measuring ambient temperature, comparing the measurement of ambient temperature with the set point temperature, using the control algorithm associated with the manually selected conditioning mode, when the manually selected conditioning mode is consistent with the comparison of ambient temperature with the set point temperature, and using the control algorithm which is not associated with the manually selected conditioning mode, when the manually selected conditioning mode is not consistent with the comparison of ambient temperature with the set point temperature.

20. The method of claim 1 wherein the step of controlling the temperature of the sleeper unit includes the steps of providing a sleeper unit temperature sensor for determining the temperature of the sleeper unit, and detecting when the sleeper unit temperature sensor has been placed outside the sleeper unit in an attempt to operate the engine continuously, with said detecting step including the steps of:

detecting when the temperature difference between the ambient temperature and the temperature reported by the sleeper unit temperature sensor is less than a predetermined value, determining the length of time the detecting step finds that the detected temperature difference is less than the predetermined value, and operating the engine in a predetermined on-off time pattern when the determining step finds the detected temperature difference is less than the predetermined value for a predetermined period of time.

21. The method of claim 20 including the step of selecting a set point temperature, and wherein the step of detecting when the sleeper unit temperature sensor has been placed outside the sleeper unit in an attempt to operate the engine continuously further includes the steps of:

determining if the selected set point temperature is within a predetermined normal comfort temperature range, and deciding that the temperature sensor is properly located within the sleeper unit when the determining step finds that the selected set point temperature is within the predetermined normal comfort temperature range.

22. The method of claim 1 *wherein* the step of controlling the temperature of the sleeper unit includes the steps of:

operating a sleeper unit fan off the battery while the engine is off, measuring the battery voltage while the sleeper unit fan is operated with the engine off, restarting the engine when the battery voltage drops to a predetermined value within a predetermined period of time, and, when the engine is restarted due to low battery voltage, the step of de-energizing the sleeper unit fan during predetermined subsequent engine off cycles.

23. The method of claim 22 wherein the predetermined subsequent engine off cycles during which the sleeper unit fan is de-energized are those which occur within a predetermined period of time after an engine start due to low battery voltage.

24. The method of claim 1 wherein the step of controlling the temperature of the sleeper unit includes the steps of:

operating a sleeper unit fan while the engine is operative, determining when an engine start is for the purpose of providing heat to the sleeper unit, and delaying the step of operating the sleeper unit fan for a predetermined period of time following an engine start to provide heat to the sleeper unit.

25. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

determining if the engine is an electronic fuel injected engine, determining the number of control relays used for engine control when the engine is an electronic fuel injected engine, storing a predetermined parameter of the engine for a predetermined relay of an electronic fuel injected engine, starting the engine when it is stopped in response to predetermined conditions, and using the stored parameter of the engine in the step of starting the engine.

26. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

calibrating the measurement of engine speed (RPM) of the engine, said calibrating step including the steps of running the engine at a predetermined RPM, and storing an indication that the truck is running at the predetermined RPM, starting the engine when it is stopped, in response to predetermined conditions, and using calibrated RPM measurements of engine speed during the step of starting the engine.

27. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

initializing battery voltage measurement, said initializing step including the step of providing an offset value by which a measured battery voltage is to be modified, starting, running and stopping the engine in response to predetermined conditions, measuring the battery voltage in response to predetermined conditions during the steps of starting, running and stopping the engine, modifying the battery measurements with the offset value, and using the modified battery measurements in the steps of starting, running, and stopping the engine.

28. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

selecting a dead band value about a selected set point temperature which will initiate starting and stopping of the engine, for controlling the temperature of the truck sleeper unit, selecting upper and lower ambient temperature limits, measuring ambient temperature, comparing the measurement of ambient temperature with the selected upper and lower ambient temperature limits, and operating the engine continuously, without regard to the selected dead band value, while the comparison step indicates that the measured ambient temperature is outside the selected upper and lower limits.

29. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

selecting a dead band value about a selected set point temperature which will initiate starting and stopping of the engine for controlling the temperature of the truck sleeper unit, measuring the running time of the engine when running to drive the temperature of the sleeper unit to a dead band value, and modifying the selected dead band value to predetermined smaller value when the measured running time exceeds a predetermined value.

30. The method of claim 29 including the step of resetting the dead band value to the selected value after a predetermined period of time.

31. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

starting and stopping the engine to maintain the temperature of the sleeper unit within a predetermined dead band range of a selected set point temperature, measuring engine off time, and running the engine continuously for a predetermined period of time, without regard to the dead band range, when a measured engine off time is less than a predetermined value.

32. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

selecting a dead band value about a selected set point temperature which will initiate starting and stopping of the engine according to predetermined cooling and heating control algorithms, selecting one of heat and cool conditioning modes, selecting a set point temperature, measuring ambient temperature, comparing the measurement of ambient temperature with the set point temperature, using the control algorithm associated with the manually selected conditioning mode, when the manually selected conditioning mode is consistent with the comparison of ambient temperature with the set point temperature, and using the control algorithm which is not associated with the manually selected conditioning mode, when the manually selected conditioning mode is not consistent with the comparison of ambient temperature with the set point temperature.

33. A method of automatically starting and stopping an engine of a truck having an ignition switch which includes on and off positions for controlling starting [a] *and* stopping of the engine, a battery having ignition switch controlled electrical loads, and a sleeper unit having a sleeper unit temperature sensor for determining the temperature of the sleeper unit, to conserve fuel while providing temperature control of the sleeper unit, and maintaining the truck engine in a ready-to-start condition, with the step of controlling the temperature of the sleeper unit comprising the steps of:

detecting when the sleeper unit temperature sensor has been placed outside the sleeper unit in an attempt to operate the engine continuously, said detecting step including the steps of:

detecting when the temperature difference between the ambient temperature and the temperature reported by the sleeper unit temperature sensor is less than a predetermined value, determining the length of time the detecting step finds that the detected temperature difference is less than the predetermined value, and operating the engine in a predetermined on-*off time pattern when the determining step finds the detected temperature difference is less than the predetermined value for a predetermined period of time.*

34. The method of claim 33 including the step of selecting a set point temperature, and wherein the step of detecting when the sleeper unit temperature sensor has been placed outside the sleeper unit in an attempt to operate the engine continuously further includes the steps of:

determining if the selected set point temperature is within a predetermined normal comfort temperature range, and deciding that the temperature sensor is properly located within the sleeper unit when the determining step finds that the selected set point temperature is within the predetermined normal comfort temperature range.

35. A method of automatically starting and stopping an engine of a truck having an ignition switch which includes on and off positions for controlling starting [a] *and* stopping of the engine, a battery having ignition switch controlled electrical loads, and a sleeper unit, to conserve fuel while providing temperature control of the sleeper unit, and maintaining the truck engine in a ready-to-start condition, comprising the steps of:

operating a sleeper unit fan off the battery while the engine is off, measuring the battery voltage while the sleeper unit fan is operated with the engine off, restarting the engine when the battery voltage drops to a predetermined value within a predetermined period of time, and, when the engine is restarted due to low battery voltage, [the step of] de-energizing the sleeper unit fan during predetermined subsequent engine off cycles.

36. The method of claim 35 wherein the predetermined subsequent engine off cycles during which the sleeper unit fan is de-energized are those which occur within a predetermined period of time after an engine start due to low battery voltage.

*37. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step of maintain the engine in a ready-to-start condition;*

*starting and stopping the engine automatically while the operator control of the engine is being overridden and the automatic temperature control mode is selected to control the temperature within the interior portion of the vehicle;*

*terminating the overriding step in response to a predetermined condition so as to restore operator control of the engine; and*

*delaying stopping of the engine by the ignition switch for a predetermined period of time after the step of terminating the overriding step.*

*38. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operat-*

*ing mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step of maintain the engine in a ready-to-start condition; and*

*starting and stopping the engine automatically while the operator control of the engine is being overridden and the automatic temperature control mode is selected to control the temperature within the interior portion of the vehicle; wherein the step of selecting predetermined system parameters comprises:*

*determining if the engine is an electronically controlled fuel injected engine;*

*determining the number of control relays used for engine control when the engine is determined to be an electronically controlled fuel injected engine;*

*storing a predetermined parameter of the engine for a predetermined relay of an electronically controlled fuel injected engine;*

*starting the engine when the engine is stopped in response to predetermined conditions; and*

*using the stored parameter of the engine in the step of starting the engine.*

*39. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to control the temperature within the interior portion of the vehicle; wherein the step of selecting predetermined system parameters comprises:*

*calibrating engine speed measurement for the engine by running the engine at a predetermined speed and storing an indication that the engine is running at the predetermined speed;*

*starting the engine after being stopped in response to predetermined conditions; and*

*using calibrated engine speed measurements during the step of starting the engine.*

*40. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to control the temperature within the interior portion of the vehicle; wherein the step of selecting predetermined system parameters comprises:*

*initializing a battery voltage measurement by affording an offset value by which a measured battery voltage is to be modified;*

*starting, running, and stopping the engine is response to predetermined conditions;*

*measuring the battery voltage in response to predetermined conditions during the steps of starting, running, and stopping the engine,*

*modifying the battery measurements with the offset value; and*

*using the modified battery measurements in the steps of starting, running, and stopping the engine.*

*41. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to*

*control the temperature within the interior portion of the vehicle; wherein the step of selecting predetermined system parameters comprises selecting a dead band value about a selected set point temperature for use in initiation starting and stopping of the engine.*

*42. The method of claim 41 wherein the step of selecting predetermined system parameters comprises:*

*selecting upper and lower ambient temperature limits;*

*determining ambient temperature;*

*comparing the determined ambient temperature with the selected upper and lower ambient temperature limits; and*

*operating the engine continuously while the step of comparing indicates that the ambient temperature is outside the selected upper and lower limits.*

*43. The method of claim 42 wherein the step of determining ambient temperature includes estimating ambient temperature.*

*44. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to control the temperature within the interior portion of the vehicle; wherein the step of selecting predetermined system parameters comprises:*

*selecting a dead band value about a selected set point temperature for use in initiating starting and stopping of the engine to control the temperature of the interior portion of the vehicle;*

*measuring running time of the engine when running to control the temperature within the interior portion of the vehicle; and*

*modifying the selected dead band value when the measured running time exceeds a predetermined value.*

*45. The method of claim 44 including the step of resetting the modified dead band value to the selected value after a predetermined period of time.*

*46. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to control the temperature within the interior portion of the vehicle; when the step of starting and stopping the engine to control the temperature within the interior portion of the vehicle comprises:*

*starting the stopping the engine to maintain the temperature of the interior portion within a predetermined dead band range of a selected set point temperature;*

*measuring engine off time; and*

*running the engine for a predetermined period of time when a measured engine off time is less than a predetermined value.*

*47. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to control the temperature within the interior portion of the vehicle; wherein the step of selecting predetermined system parameters comprises:*

*selecting a dead band value about a selected set point temperature which is used in initiating starting and stopping of the engine according to predetermined cooling and heating control algorithms;*

*selecting one of heat and cool conditioning modes;*

*selecting a set point temperature;*

*comparing ambient temperature with the set point temperature;*

*using a control algorithm associated with the selected conditioning mode when the selected conditioning*

*mode is consistent with the comparison of ambient temperature with the set point temperature; and*

*using a control algorithm when is not associated with the selected conditioning mode when the selected conditioning mode is not consistent with the comparison of ambient temperature with the set point temperature.*

*48. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to control the temperature within the interior portion of the vehicle; wherein the vehicle includes a temperature sensor disposed within the interior portion of the vehicle and wherein the step of starting and stopping the engine to control the temperature of an interior portion of the vehicle comprises detecting when the temperature sensor has been placed outside of the interior portion of the vehicle.*

*49. The method of claim 48 wherein detecting when the temperature sensor has been placed outside of the interior portion of the vehicle comprises:*

*detecting a difference between the ambient temperature and the temperature within the interior portion which is less than a first predetermined value;*

*determining a length of time during which the difference is less than the first predetermined value; and*

*operating the engine in a predetermined on-off pattern when the length of time exceeds a second predetermined value.*

*50. The method of claim 49 further comprising selecting a set point temperature.*

*51. The method of claim 50 wherein the step of detecting when the temperature sensor has been placed outside of the interior portion of the vehicle comprises:*

*determining if the selected set point temperature is within a predetermined temperature range; and*

*concluding that the temperature sensor is properly located within the interior portion of the vehicle when the set point temperature is determined to be within the predetermined temperature range.*

*52. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, a battery, and a fan for circulating air within the interior portion of the vehicle, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic temperature control mode is selected to control the temperature within the interior portion of the vehicle; wherein the step of starting and stopping the engine to control the temperature of the interior portion further comprises:*

*operating the fan off the battery while the engine is not running;*

*restarting the engine when the battery voltage becomes less than a predetermined value within a predetermined period of time; and*

*disabling the fan from operating during subsequent periods when the engine is not running if the engine has been restarted by the restarting step.*

*53. The method of claim 52 wherein the subsequent periods during which the fan is disabled are those which occur with a predetermined period of time after the engine has been restarted by the restarting step.*

*54. A method of automatically starting and stopping an engine in a vehicle to conserve fuel while maintaining the engine in a ready-to-start condition and providing temperature control of an interior portion of the vehicle, the vehicle having an ignition switch which includes on and off positions for controlling starting and stopping of the engine, means for selecting an automatic engine start-stop operating mode, means for selecting an automatic temperature control mode, safety means for indicating when the engine may be safely started, and a fan for circulating air within the interior portion of the vehicle, the method comprising:*

*selecting predetermined system parameters;*

*overriding operator control of the engine in response to a predetermined condition when the means for selecting an automatic engine start-stop mode selects the automatic start-stop mode and the safety means indicates the engine may be safely operated in the automatic start-stop mode;*

*starting and stopping the engine automatically while the operator control of the engine is being overridden by the overriding step to maintain the engine in a ready-to-start condition; and*

*starting and stopping the engine automatically while the operator control of the engine is being overridden and the automatic control mode is selected to control the temperature within the interior portion of the vehicle; wherein the step of starting and stopping the engine to control the temperature of the interior portion of the vehicle comprises:*

*determining if an engine start is initiated to provide heat to the interior portion of the vehicle; and*

*operating the fan prior to an engine start initiated to provide heat.*

*55. A method of automatically starting an electronically controlled fuel injected engine in a vehicle including a number of control relays used for engine control, the method comprises:*

*storing a predetermined parameter of the engine for a predetermined control relay;*

*starting the engine when the engine is stopped in response to predetermined conditions; and*

*using the stored parameter of the engine in the step of starting the engine.*

*56. A method of automatically starting an engine in a vehicle to conserve fuel while maintaining the engine in a ready-to-start condition and providing temperature control for an interior portion of the vehicle, the method comprising:*

*calibrating measurement of engine speed of the engine by running the engine at a predetermined engine speed and storing an indication that the engine is running at the predetermined engine speed;*

*starting the engine when the engine is stopped in response to predetermined conditions; and*

*using calibrated engine speed measurements during the step of starting the engine.*

*57. A method of automatically starting and stopping an engine of a vehicle having a battery so as to conserve fuel while maintaining the engine in a ready-to-start condition and providing temperature control of an interior portion of the vehicle, and method comprising:*

*providing an offset value by which a measured battery voltage is to be modified;*

*starting, running, and stopping the engine in response to predetermined conditions;*

*measuring a voltage of the battery in response to predetermined conditions during the steps of starting, running and stopping the engine;*

*modifying the voltage measurements with the offset value; and*

*using the modified voltage measurements in the steps of starting, running, and stopping the engine.*

*58. A method of automatically operating an engine of a vehicle to conserve fuel while maintaining the engine in a ready-to-start condition and providing temperature control of an interior portion of the vehicle, the method comprising:*

*selecting a dead band value about a selected set point temperature used in initiating starting and stopping of the engine to control the temperature within the interior portion of the vehicle;*

*selecting upper and lower ambient temperature limits;*

*determining ambient temperature;*

*comparing the determined ambient temperature with the selected upper and lower ambient temperature limits; and*

*operating the engine while the comparison step indicates that the ambient temperature is outside the selected upper and lower limits.*

*59. A method of automatically starting and stopping an engine of a vehicle to conserve fuel while maintaining the engine in a ready-to-start condition and providing temperature control for the interior portion of the vehicle, the method comprising:*

*selecting a dead band value about a selected set point temperature used in initiating starting and stopping of the engine to control the temperature within the interior portion of the vehicle;*

*determining the running time of the engine; and*

*modifying the selected dead band value when the measured running time exceeds a predetermined value.*

*60. The method of claim 59 further comprising:*

*resetting the modified dead band value to the selected value after a predetermined period of time.*

*61. A method of automatically starting and stopping an engine of a vehicle to conserve fuel while maintaining the engine in a ready-to-start condition and providing temperature control of an interior portion of the vehicle, the method comprising:*

*starting and stopping the engine to maintain the temperature within the interior portion of the vehicle within a predetermined dead band range of a selected set point temperature;*

*determining engine off time; and*

*running the engine for a predetermined period of time when the engine off time is less than a predetermined value.*

*62. A method of automatically starting and stopping an engine of a vehicle to conserve fuel while maintaining the engine in a ready-to-start condition and providing temperature control of an interior portion of the vehicle, the method comprising:*

*selecting a dead band value about a selected set point temperature which is used in initiating starting and stopping of the engine according to predetermined cooling and heating control algorithms;*

*selecting one of head and cool conditioning modes;*

*selecting a set point temperature;*

*determining ambient temperature;*

*comparing the ambient temperature with the set point temperature;*

*using a first control algorithm to start and stop the engine when the selected conditioning mode is consistent with the comparison of ambient temperature and the set point temperature; and*

*using a second control algorithm to start and stop the engine when the selected conditioning mode is inconsistent with the comparison of ambient temperature and the set point temperature.*

*63. A method of automatically starting and stopping an engine of a vehicle to conserve fuel while providing temperature control for an interior portion of the vehicle having a temperature sensor disposed therein, the method comprising:*

*detecting when the temperature sensor has been placed outside the interior portion in an attempt to keep the engine running; and starting and stopping the engine based on the result of the step of detecting.*

*64. The method of claim 63 wherein detecting when the temperature sensor has been placed outside the interior portion comprises:*

*detecting when a difference between ambient temperature and temperature detected by the temperature sensor is less than a first predetermined value; and*

*determining a length of time during which the difference is less than the first predetermined value;*

*wherein the step of starting and stopping includes operating the engine in a predetermined on-off pattern when the length of time exceeds a second predetermined value.*

*65. The method of claim 64 further comprising:*

*selecting a set point temperature;*

*concluding that the temperature sensor is disposed within the interior portion of the vehicle when the selected set point temperature is within a predetermined temperature range.*

*66. A method of automatically operating an engine of a vehicle to conserve fuel while maintaining the engine in a ready-to-start condition and providing temperature control for an interior portion of the vehicle having a fan for circulating air thereabout, the method comprising:*

*operating the fan utilizing a battery while the engine is off;*

*measuring voltage of the battery while the fan is operated and the engine is off; and*

*restarting the engine when the measured voltage becomes less than a predetermined value within a first predetermined period of time.*

*67. The method of claim 66 further comprising:*

*disabling operating of the fan while the engine is off if the engine has been restarted due to the measured voltage becoming less than the predetermined value within the first predetermined period of time.*

*68. The method of claim 67 wherein the disabling step is performed only if the engine has been restarted within a second predetermined period of time.*

*69. A system for automatically starting and stopping an engine in a vehicle to maintain the engine in a ready-to-start condition, the vehicle having an ignition switch which includes on and off positions for requesting starting and stopping of the engine, means for selecting an automatic engine start-stop operating mode, and safety means for indicating when the engine may be safely started, the system comprising:*

*a memory for storing a control program; and*

*a controller in communication with the memory for executing the control program to allow selection of predetermined system parameters so as to accommodate different engine designs and operating modes, override operator control of the engine in response to a predetermined condition when the means for selecting an automatic engine start-stop mode selects the automatic start-stop mode and the safety means indicates the engine may be safely operated in the automatic start-stop mode, and to start and stop the engine automatically while the operator control of the engine is being overridden by the override step to maintain the engine in a ready-to-start condition.*

*70. The system of claim 69 wherein the vehicle includes an interior portion, the system further comprising:*

*a selector in communication with the controller for requesting an automatic temperature control mode.*

*71. The system of claim 70 wherein the control program starts and stops the engine automatically vehicle the operator control of the engine is being overridden and the automatic temperature control mode is selected.*

* * * * *